United States Patent
Soriaga et al.

(10) Patent No.: US 11,546,029 B2
(45) Date of Patent: Jan. 3, 2023

(54) HYBRID CHANNEL STATE FEEDBACK

(71) Applicant: Qualcomm Incorporated, San Diego, CA (US)

(72) Inventors: Joseph Binamira Soriaga, San Diego, CA (US); Pavan Kumar Vitthaladevuni, San Diego, CA (US); Bo Chen, Beijing (CN); Ruifeng Ma, Beijing (CN); Yu Zhang, Beijing (CN); Alexandros Manolakos, Escondido, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/310,312

(22) PCT Filed: Jan. 28, 2020

(86) PCT No.: PCT/CN2020/074054
§ 371 (c)(1),
(2) Date: Jul. 27, 2021

(87) PCT Pub. No.: WO2020/156492
PCT Pub. Date: Aug. 6, 2020

(65) Prior Publication Data
US 2022/0109475 A1  Apr. 7, 2022

(30) Foreign Application Priority Data

Jan. 28, 2019 (CN) ................. PCT/CN2019/073361

(51) Int. Cl.
*H04B 7/0456* (2017.01)
*H04B 7/06* (2006.01)
(Continued)

(52) U.S. Cl.
CPC ......... *H04B 7/0486* (2013.01); *H04B 7/0617* (2013.01); *H04L 1/0026* (2013.01);
(Continued)

(58) Field of Classification Search
CPC .. H04B 7/0486; H04B 7/0617; H04B 7/0626; H04L 1/0026; H04L 5/0051; H04L 5/0057
(Continued)

(56) References Cited

U.S. PATENT DOCUMENTS

| 2012/0220286 A1 | 8/2012 | Chen et al. |
| 2013/0028345 A1* | 1/2013 | Ko ................... H04L 25/03898 375/267 |

(Continued)

FOREIGN PATENT DOCUMENTS

| CN | 103873124 A | 6/2014 |
| CN | 105207738 A | 12/2015 |

(Continued)

OTHER PUBLICATIONS

Huawei, et al., "Full Reciprocity based CSI Acquisition Mechanism", 3GPP TSG RAN WG1 Meeting #90, R1-1713759, Aug. 25, 2017 (Aug. 25, 2017), 3 Pages.
(Continued)

*Primary Examiner* — Fitwi Y Hailegiorgis
(74) *Attorney, Agent, or Firm* — Qualcomm Incorporated

(57) ABSTRACT

Methods, systems, and devices for wireless communications are described. Techniques described herein provide for a user equipment (UE) receiving a set of downlink reference signals associated with a downlink channel. In some cases, the set of downlink reference signals may include a channel state information reference signals (CSI-RS). The UE may calculate a transmission rank and a channel quality based on the received set of downlink reference signals. In some
(Continued)

cases, the indication of the transmission rank may include a rank indication (RI), and the indication of the channel quality includes a channel quality indicator (CQI). The UE may then transmit the indications of the transmission rank and the channel quality using an uplink control channel, and may transmit an indication of a remaining channel state feedback using a precoded uplink reference signal.

30 Claims, 16 Drawing Sheets

(51) Int. Cl.
  *H04L 1/00*    (2006.01)
  *H04L 5/00*    (2006.01)
(52) U.S. Cl.
  CPC .......... *H04L 5/0051* (2013.01); *H04L 5/0057* (2013.01); *H04B 7/0626* (2013.01)
(58) Field of Classification Search
  USPC ........................................................ 375/267
  See application file for complete search history.

(56) References Cited

U.S. PATENT DOCUMENTS

2018/0048365 A1    2/2018  Yoo et al.
2019/0028162 A1*   1/2019  Lee ...................... H04L 5/0053

FOREIGN PATENT DOCUMENTS

| CN | 108631847 A | 10/2018 |
| EP | 3337053 A1 | 6/2018 |
| EP | 3373632 A1 | 9/2018 |
| WO | WO-2016093745 A1 | 6/2016 |
| WO | WO-2018031924 A1 | 2/2018 |
| WO | WO-2018202206 A1 | 11/2018 |

OTHER PUBLICATIONS

Huawei, et al., "Non-Codebook Based Transmission for UL MIMO", 3GPP TSG RAN WG1 NR Ad Hoc Meeting, R1-1709923, Jun. 30, 2017 (Jun. 30, 2017), 7 Pages, chapters 1-2, the whole document.
International Search Report and Written Opinion—PCT/CN2019/073361—ISA/EPO—dated Oct. 29 2019.
International Search Report and Written Opinion—PCT/CN2020/074054—ISA/EPO—dated Apr. 24, 2020.
Qualcomm Incorporated: "CSI Acquisition for Reciprocity Based Operation", 3GPP TSG RAN WG1 #90, R1-1713395, Aug.25, 2017 (Aug. 25, 2017), pp. 1-5, the whole document.
Zte, et al., "On Reciprocity Based CSI Acquisition," 3GPP TSG RAN WG1 Meeting NR #3, R1-1715455, Sep. 21, 2017 (Sep. 21, 2017), 7 pages, chapters 1 and 2. 1.
Huawei., et al., "Discussion on Reciprocity Based CSI Acquisition Mechanism", 3GPP TSG RAN WG1 NR Ad Hoc Meeting, R1-1711404, 3rd Generation Partnership Project, Mobile Competence Centre, 650, Route Des Lucioles, F-06921 Sophia-Antipolis Cedex, France, vol. Ran WG1, No. Qingdao, China, Jun. 27, 2017-Jun. 30, 2017, Jun. 26, 2017, XP051300592, 4 Pages, the whole document.
Supplementary European Search Report—EP20749294—Search Authority—Munich—dated Sep. 22, 2022.

* cited by examiner

HYBRID CHANNEL STATE FEEDBACK

CROSS REFERENCE TO RELATED APPLICATIONS

The present application for patent claims priority to International Patent Application No. PCT/CN2020/074054 by Soriaga et al., entitled "HYBRID CHANNEL STATE FEEDBACK," filed Jan. 28, 2020; and to International Patent Application No. PCT/CN2019/073361 by Soriaga et. al., entitled "HYBRID CHANNEL STATE FEEDBACK," filed Jan. 28, 2019, each of which is assigned to the assignee hereof, and each of which is expressly incorporated by reference in its entirety herein.

BACKGROUND

The following relates generally to wireless communications, and more specifically to hybrid channel state feedback.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Base stations and UEs in wireless multiple-access communications systems may transmit a number of different reference signals that a receiver may measure and use to determine one or more parameters. Reference signals may be transmitted using a known reference signal sequence and using known wireless resources, such that the receiver may make measurements based on comparisons between the known reference signal sequence and the received reference signal. However, in such systems, transmission of reference signals consumes some amount of overhead, which may reduce the overall network efficiency.

SUMMARY

The described techniques relate to improved methods, systems, devices, and apparatuses that support hybrid channel state feedback. Generally, the described techniques provide for signaling a hybrid-analog channel state feedback. A user equipment (UE) may receive a set of downlink reference signals associated with a downlink channel. In some cases, the set of downlink reference signals may include a channel state information reference signals (CSI-RS). The UE may calculate a transmission rank and a channel quality based on the received set of downlink reference signals. For example, the UE may estimate transmission rank and the channel quality based on one or more precoded CSI-RS ports. In some cases, the indication of the transmission rank may include a rank indication (RI), and the indication of the channel quality includes a channel quality indicator (CQI). The UE may transmit the indications of the transmission rank and the channel quality using a payload in an uplink control channel. The UE may additionally transmit an indication of a remaining channel state feedback either implicitly or explicitly. For example, the UE may transmit channel state feedback using a precoded uplink reference signal in such a way that upon receipt of the precoded uplink reference signal, the base station may decompose or otherwise process the precoded uplink reference signal, combine the information with the received RI and CQI and determine a state of the downlink channel. In some cases, the UE may be configured to precode the uplink reference signal using left eigen vectors, and the base station may be configured to identify the right eigen vector upon receiving the uplink reference signal.

A method of wireless communications at a UE is described. The method may include receiving a set of downlink reference signals associated with a downlink channel, calculating a transmission rank and a channel quality based on the received set of downlink reference signals, transmitting an indication of the transmission rank and an indication of the channel quality on an uplink control channel, and transmitting one or more uplink reference signals that indicate a first precoding matrix associated with the calculated transmission rank and the calculated channel quality.

An apparatus for wireless communications at a UE is described. The apparatus may include a processor, memory in electronic communication with the processor, and instructions stored in the memory. The instructions may be executable by the processor to cause the apparatus to receive a set of downlink reference signals associated with a downlink channel, calculate a transmission rank and a channel quality based on the received set of downlink reference signals, transmit an indication of the transmission rank and an indication of the channel quality on an uplink control channel, and transmit one or more uplink reference signals that indicate a first precoding matrix associated with the calculated transmission rank and the calculated channel quality.

Another apparatus for wireless communications at a UE is described. The apparatus may include means for receiving a set of downlink reference signals associated with a downlink channel, calculating a transmission rank and a channel quality based on the received set of downlink reference signals, transmitting an indication of the transmission rank and an indication of the channel quality on an uplink control channel, and transmitting one or more uplink reference signals that indicate a first precoding matrix associated with the calculated transmission rank and the calculated channel quality.

A non-transitory computer-readable medium storing code for wireless communications at a UE is described. The code may include instructions executable by a processor to receive a set of downlink reference signals associated with a downlink channel, calculate a transmission rank and a channel quality based on the received set of downlink reference signals, transmit an indication of the transmission rank and an indication of the channel quality on an uplink control channel, and transmit one or more uplink reference signals that indicate a first precoding matrix associated with the calculated transmission rank and the calculated channel quality.

Some examples of the method, apparatuses, and non-transitory computer-readable medium described herein may further include operations, features, means, or instructions for precoding the uplink reference signal with a second precoding matrix, where the second precoding matrix may be based on the received set of downlink reference signals.

Some examples of the method, apparatuses, and non-transitory computer-readable medium described herein may further include operations, features, means, or instructions for estimating a channel state for the downlink channel based on the received set of downlink reference signals, and calculating an eigenvector corresponding to a singular value decomposition (SVD) of a matrix combination corresponding to the estimated channel state, where precoding the uplink reference signal may be further based on the calculated eigenvector.

Some examples of the method, apparatuses, and non-transitory computer-readable medium described herein may further include operations, features, means, or instructions for transmitting the one or more uplink reference signals using at least a subset of antennas of the UE, where the first precoding matrix may be based on a strongest eigenvector of a set of eigenvectors calculated by the UE. In some cases, the subset of the antennas of the UE may include all antennas of the UE.

In some examples of the method, apparatuses, and non-transitory computer-readable medium described herein, the set of downlink reference signals includes channel state information reference signals (CSI-RS). In some examples of the method, apparatuses, and non-transitory computer-readable medium described herein, the CSI-RS may be precoded signals.

Some examples of the method, apparatuses, and non-transitory computer-readable medium described herein may further include operations, features, means, or instructions for determining a number of transmission ports based on the calculated transmission rank, where transmitting the one or more uplink reference signals may be based on the determined number of transmission ports. In some examples of the method, apparatuses, and non-transitory computer-readable medium described herein, the determined number of transmission ports may be less than a total number of transmission ports supported by the UE.

Some examples of the method, apparatuses, and non-transitory computer-readable medium described herein may further include operations, features, means, or instructions for beamforming the one or more uplink reference signals, where the first precoding matrix may be indicated based on a direction of the beamforming. Some examples of the method, apparatuses, and non-transitory computer-readable medium described herein may further include operations, features, means, or instructions for decomposing the first precoding matrix, multiplexing first and second components of the first precoding matrix, and transmitting the first component of the first precoding matrix using a first antenna and the second component of the first precoding matrix using a second antenna such that a superimposition of the first and second components indicates the first precoding matrix.

Some examples of the method, apparatuses, and non-transitory computer-readable medium described herein may further include operations, features, means, or instructions for adding an error margin to the calculated transmission rank and the calculated channel quality based on an uplink power control indication for the UE. Some examples of the method, apparatuses, and non-transitory computer-readable medium described herein may further include operations, features, means, or instructions for receiving a transmission configuration for transmitting the one or more uplink reference signals, where a number of transmission ports available for transmitting the one or more uplink reference signals may be less than a total number of transmission ports supported by the UE.

Some examples of the method, apparatuses, and non-transitory computer-readable medium described herein may further include operations, features, means, or instructions for adjusting an uplink power control at the UE based on the received transmission configuration and based on the number of transmission ports available for transmitting the one or more uplink reference signals being less than the total number of transmission ports supported by the UE. Some examples of the method, apparatuses, and non-transitory computer-readable medium described herein may further include operations, features, means, or instructions for repeating a transmission of the one or more uplink reference signals from a subset of the total number of transmission ports supported by the UE that exceed a quality threshold based on the received transmission configuration and based on the number of transmission ports available for transmitting the one or more uplink reference signals being less than the total number of transmission ports supported by the UE.

In some examples of the method, apparatuses, and non-transitory computer-readable medium described herein, the uplink control channel includes a physical uplink control channel (PUCCH). In some examples of the method, apparatuses, and non-transitory computer-readable medium described herein, the indication of the transmission rank includes a rank indication (RI). In some examples of the method, apparatuses, and non-transitory computer-readable medium described herein, the indication of the channel quality includes a channel quality indicator (CQI).

In some examples of the method, apparatuses, and non-transitory computer-readable medium described herein, the indication of the first precoding matrix includes a precoding matrix indicator (PMI). In some examples of the method, apparatuses, and non-transitory computer-readable medium described herein, the one or more uplink reference signals includes one or more sounding reference signals (SRS).

Some examples of the method, apparatuses, and non-transitory computer-readable medium described herein may further include operations, features, means, or instructions for transmitting the indication of the transmission rank and the indication of the channel quality in a channel status information (CSI) report, where the CSI report may be periodic, aperiodic, or a combination thereof.

In some examples of the method, apparatuses, and non-transitory computer-readable medium described herein, the periodic CSI report may be associated with one or more periodic uplink reference signals, a periodicity of the periodic CSI report may be different from a periodicity of the one or more periodic uplink reference signals, the periodic CSI report may be associated with one or more aperiodic uplink reference signals, the aperiodic CSI report may be associated with the one or more aperiodic uplink reference signals, or a combination thereof. In some examples of the method, apparatuses, and non-transitory computer-readable medium described herein, the aperiodic CSI report may be transmitted within a maximum time threshold of the aperiodic uplink reference signal transmission.

A method of wireless communications at a base station is described. The method may include transmitting a set of downlink reference signals associated with a downlink channel, receiving an indication of a transmission rank and an indication of a channel quality, where the transmission rank and the channel quality are based on the transmitted set of downlink reference signals, receiving one or more uplink reference signals that indicate a first precoding matrix associated with the transmission rank and the channel quality, and determining the first precoding matrix associated with the transmission rank and the channel quality based on the received one or more uplink reference signals.

An apparatus for wireless communications at a base station is described. The apparatus may include a processor, memory in electronic communication with the processor, and instructions stored in the memory. The instructions may be executable by the processor to cause the apparatus to transmit a set of downlink reference signals associated with a downlink channel, receive an indication of a transmission rank and an indication of a channel quality, where the transmission rank and the channel quality are based on the transmitted set of downlink reference signals, receive one or more uplink reference signals that indicate a first precoding matrix associated with the transmission rank and the channel quality, and determine the first precoding matrix associated with the transmission rank and the channel quality based on the received one or more uplink reference signals.

Another apparatus for wireless communications at a base station is described. The apparatus may include means for transmitting a set of downlink reference signals associated with a downlink channel, receiving an indication of a transmission rank and an indication of a channel quality, where the transmission rank and the channel quality are based on the transmitted set of downlink reference signals, receiving one or more uplink reference signals that indicate a first precoding matrix associated with the transmission rank and the channel quality, and determining the first precoding matrix associated with the transmission rank and the channel quality based on the received one or more uplink reference signals.

A non-transitory computer-readable medium storing code for wireless communications at a base station is described. The code may include instructions executable by a processor to transmit a set of downlink reference signals associated with a downlink channel, receive an indication of a transmission rank and an indication of a channel quality, where the transmission rank and the channel quality are based on the transmitted set of downlink reference signals, receive one or more uplink reference signals that indicate a first precoding matrix associated with the transmission rank and the channel quality, and determine the first precoding matrix associated with the transmission rank and the channel quality based on the received one or more uplink reference signals.

Some examples of the method, apparatuses, and non-transitory computer-readable medium described herein may further include operations, features, means, or instructions for estimating a channel state for the downlink channel based on the one or more received uplink reference signals, and calculating an eigenvector corresponding to an SVD of a matrix combination corresponding to the estimated channel state, where the one or more received uplink reference signals may be precoded by a second precoding matrix, and where determining the first precoding matrix may be based on the calculated eigenvector.

Some examples of the method, apparatuses, and non-transitory computer-readable medium described herein may further include operations, features, means, or instructions for receiving the one or more uplink reference signals from each antenna of a UE, estimating a channel state of the downlink channel based on the received set of uplink reference signals, and identifying a strongest eigenvector from a set of eigenvectors corresponding to the estimated channel state, where determining the first precoding matrix may be further based on the identified strongest eigenvector.

Some examples of the method, apparatuses, and non-transitory computer-readable medium described herein may further include operations, features, means, or instructions for precoding the set of downlink reference signals. Some examples of the method, apparatuses, and non-transitory computer-readable medium described herein may further include operations, features, means, or instructions for transmitting a transmission configuration for receiving the one or more uplink reference signals, where a number of transmission ports available at a UE for transmitting the one or more uplink reference signals may be less than a total number of transmission ports supported by the UE.

In some examples of the method, apparatuses, and non-transitory computer-readable medium described herein, the indication of the transmission rank includes an RI. In some examples of the method, apparatuses, and non-transitory computer-readable medium described herein, the indication of the channel quality includes a CQI. In some examples of the method, apparatuses, and non-transitory computer-readable medium described herein, the indication of the first precoding matrix includes a PMI. In some examples of the method, apparatuses, and non-transitory computer-readable medium described herein, the one or more uplink reference signals includes one or more SRS.

Some examples of the method, apparatuses, and non-transitory computer-readable medium described herein may further include operations, features, means, or instructions for receiving the indication of the transmission rank and the indication of the channel quality in a CSI report, where the CSI report may be periodic, aperiodic, or a combination thereof.

In some examples of the method, apparatuses, and non-transitory computer-readable medium described herein, the periodic CSI report may be associated with one or more periodic uplink reference signals, a periodicity of the periodic CSI report may be different from a periodicity of the one or more periodic uplink reference signals, the periodic CSI report may be associated with one or more aperiodic uplink reference signals, the aperiodic CSI report may be associated with the one or more aperiodic uplink reference signals, or a combination thereof. In some examples of the method, apparatuses, and non-transitory computer-readable medium described herein, the aperiodic CSI report may be transmitted within a maximum time threshold of the aperiodic uplink reference signal transmission.

DETAILED DESCRIPTION

Figure 1:
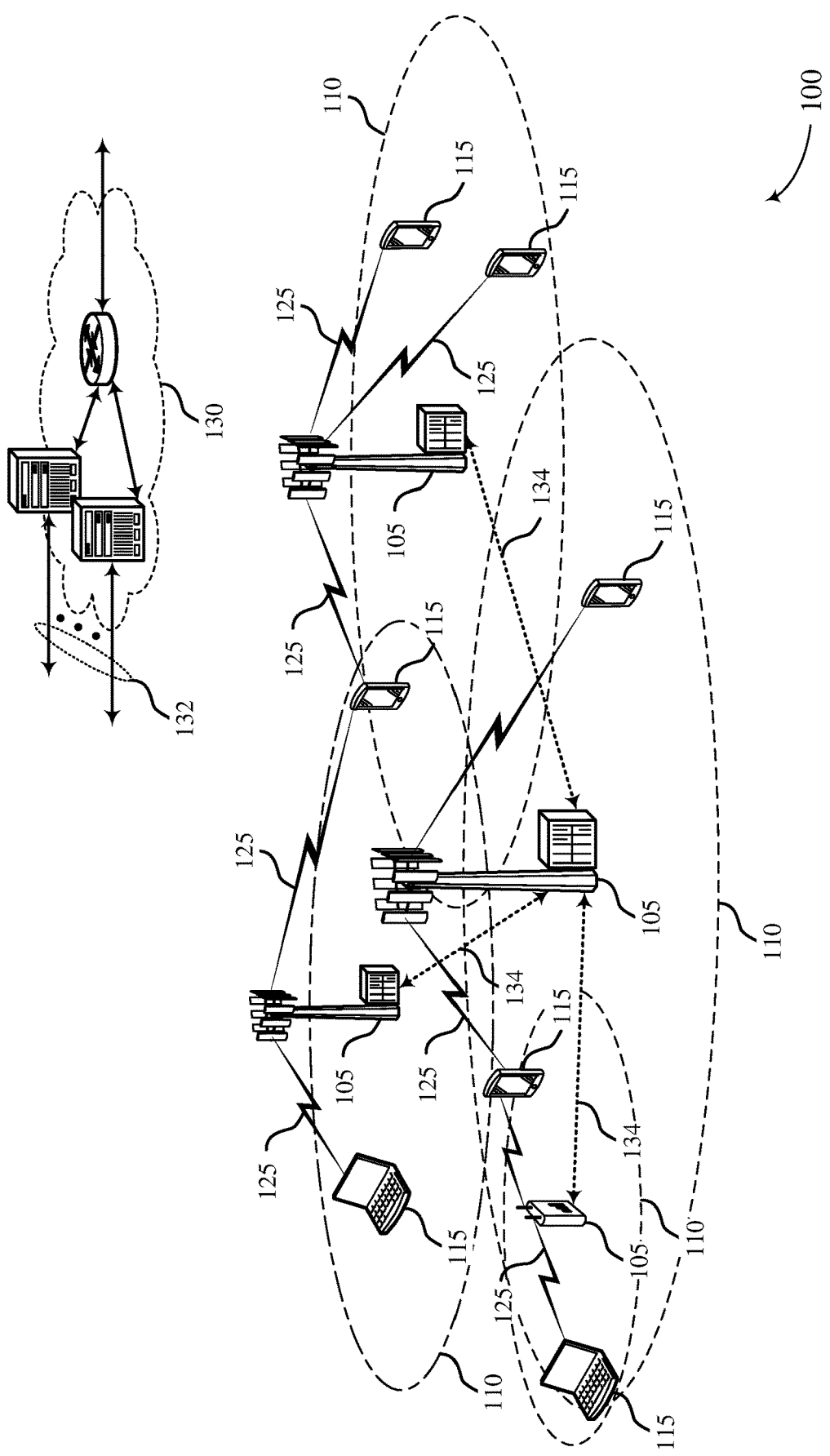
FIG. 1 illustrates an example of a wireless communications system that supports hybrid channel state feedback in accordance with aspects of the present disclosure.

Some wireless communications systems may include a base station and a user equipment (UE) implementing a hybrid-analog channel state feedback procedure for robust communication. Techniques described herein provide for a UE to receive a set of downlink reference signals associated with a downlink channel. In some cases, the set of downlink reference signals may include a channel state information reference signals (CSI-RS). The UE may then calculate a transmission rank and a channel quality based on the received set of downlink reference signals. For example, the UE may identify multiple ports associated with the CSI-RS, and may estimate a downlink channel based on the precoded CSI-RS ports. According to one or more aspects, the UE may estimate transmission rank and the channel quality based on the precoded CSI-RS ports. In some cases, the indication of the transmission rank may include a rank indication (RI), and the indication of the channel quality includes a channel quality indicator (CQI). In some cases, the UE may report the transmission rank and the channel quality using a payload in an uplink control channel (e.g., a physical uplink control channel (PUCCH)). Specifically, the UE may transmit an indication of the transmission rank and an indication of the channel quality on an uplink control channel. The UE may then transmit one or more uplink reference signals that indicate a first precoding matrix associated with the calculated transmission rank and the calculated channel quality. That is, the UE may explicitly or implicitly convey a precoding matrix or similar precoder information via the transmission of one or more uplink reference signals (e.g., sounding reference signals (SRS)).

According to one or more aspects, the UE may transmit indication of a remaining channel state feedback using a precoded uplink reference signal. In some cases, the UE may precode the uplink reference signal with a second precoding matrix, where the second precoding matrix is based on the received set of downlink reference signals. For example, the UE may be configured to precode the uplink reference signal using left eigen vectors, and the base station may be configured to identify the right eigen vector upon receiving the uplink reference signal. Based on the determination of the right eigen vector, the base station may determine information typically conveyed in a quantized matrix indicating a precoding matrix indicator (PMI), for example. However, conveying the precoder information associated with the calculated rank indication and/or the calculated channel quality information using precoded uplink reference signals may reduce an amount of overhead sent from the UE as compared to transmitting a quantized PMI matrix.

Aspects of the disclosure are initially described in the context of a wireless communications system. Aspects of the disclosure are described in the context of communication scheme. Aspects of the disclosure are further illustrated by and described with reference to apparatus diagrams, system diagrams, and flowcharts that relate to hybrid channel state feedback.

FIG. 1 illustrates an example of a wireless communications system 100 that supports hybrid channel state feedback in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

According to one or more aspects of the present disclosure, the UE 115 may determine a column vector of length as a number of UE antennas, and a column vector of length as number of antennas used at the base station 105. To increase the spatial multiplexing the UE 115 may determine the optimal precoding directions through singular value decomposition (SVD). The UE 115 may then diagonalize the channel along eigenvalues. According to one example, a method for obtaining the channel state at the UE 115 may include estimating the channel state from the downlink CSI-RS. In some cases, using non-precoded CSI-RS may result in estimation error and thus may not be desirable. Alternatively, beam-formed CSI-RS may employed where the term B is used as the precoding matrix applied to the CSI-RS ports. The number of columns in the precoding matrix may be smaller than the number of ports available at the base station 105. Such a method may result in high latency and high payload.

Aspects of the present disclosure provide methods for obtaining the channel state at the base station 105. According to one or more aspects, the base station 105 may estimate the channel state from a precoded uplink SRS. In some cases, the SRS may be precoded and the base station 105 may be able to estimate the precoded channel. Techniques described herein provide for UE 115 receiving a set of downlink reference signals associated with a downlink channel. In some cases, the set of downlink reference signals may include a CSI-RS. The UE 115 may then calculate a transmission rank and a channel quality based on the received set of downlink reference signals. In some cases, the UE 115 may transmit the indication of the CQI and/or RI using a payload in an uplink control channel (such as PUCCH). In some cases, the UE 115 may report a remaining channel state feedback using a precoded SRS. For example, the UE 115 may transmit one or more uplink reference signals that indicate a first precoding matrix associated with the calculated transmission rank and the calculated channel quality. Additionally or alternatively, as described in more detail herein, the UE 115 may convey precoding information implicitly to the base station 105 by sounding all available antennas (e.g., sending un-precoded uplink reference signals), whereby the base station 105 may determine the appropriate precoding information (e.g., a strongest eigenvector), which may correspond with a strongest eigenvector selected at the UE 115 based on channel estimates performed by both the UE 115 and the base station 105.

Figure 2:
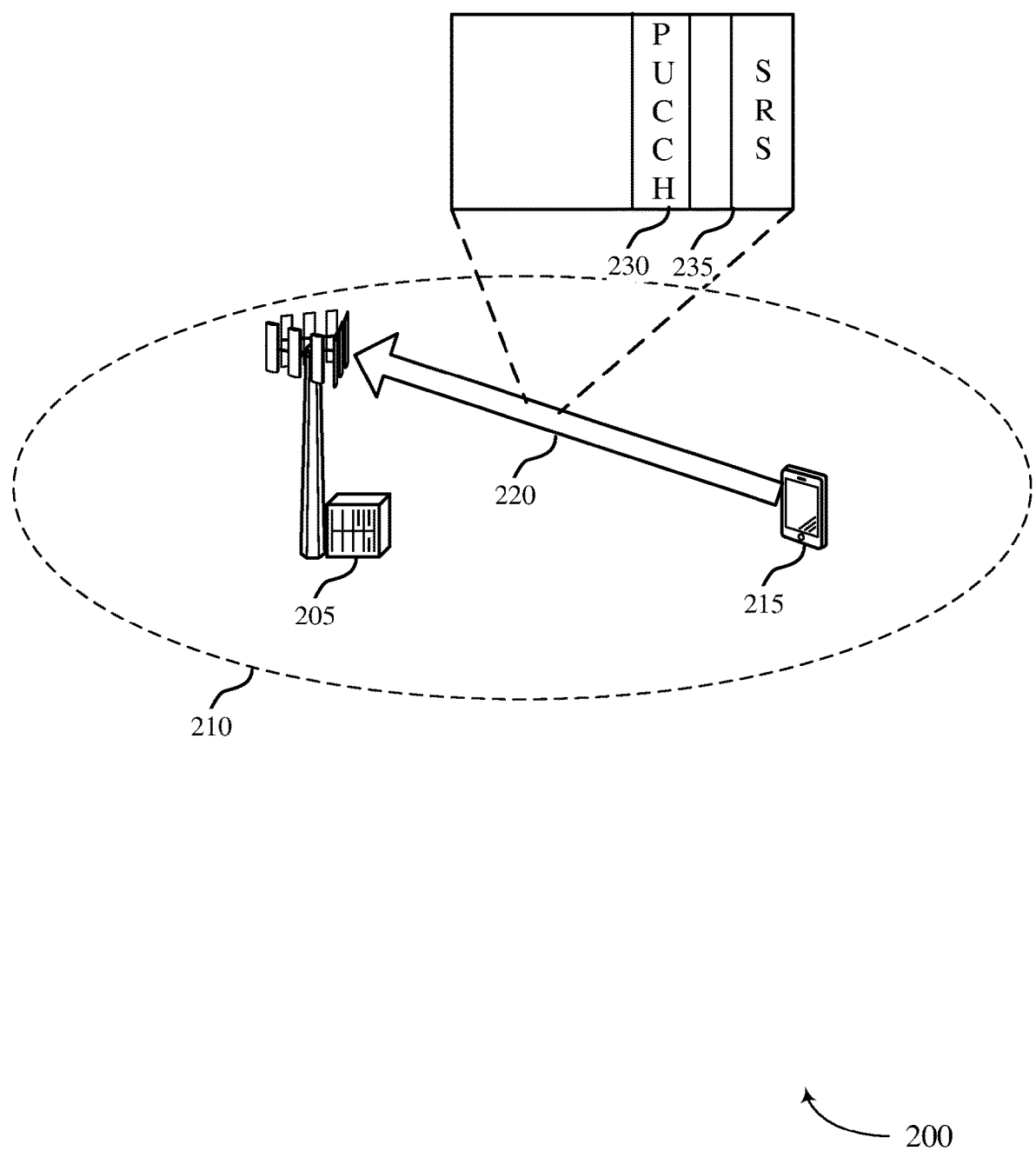
FIG. 2 illustrates an example of a wireless communications system that supports hybrid channel state feedback in accordance with aspects of the present disclosure.

FIG. 2 illustrates an example of a wireless communications system 200 that supports hybrid channel state feedback in accordance with aspects of the present disclosure. In some examples, wireless communications system 200 may implement aspects of wireless communications system 100. Wireless communications system 200 may include a base station 205 and a UE 215, which may be examples of the corresponding devices described with reference to FIG. 1. In the example of FIG. 2, the wireless communications system 200 may operate according to a radio access technology (RAT) such as a 5G or NR RAT, although techniques described herein may be applied to any RAT and to systems that may concurrently use two or more different RATs. In some cases, wireless communications system 200 may operate according to 5G or NR RAT and support CSI-RS and SRS transmissions.

In some examples, UE 215 may establish a connection (e.g., link 220) with base station 205. Base station 205 and UE 215 may communicate via the bidirectional link 220 within a coverage area 210. Base station 205 and UE 215 may implement a hybrid-analog channel state feedback procedure. According to one or more aspects of the present disclosure, the UE 215 may receive a set of downlink reference signals associated with a downlink channel. In some cases, the set of downlink reference signals may include CSI-RS. The UE 215 may then calculate a transmission rank and a channel quality based on the received set of downlink reference signals. In some cases, the UE 215 may estimate H*B across precoded CSI-RS ports to estimate RI and/or CQI, where H represents an estimate of the channel and B represents a precoder used for the CSI-RS. In some cases, the UE 215 may report the CQI and/or RI using a payload in an uplink control channel 230 (such as PUCCH). Specifically, the UE 215 may calculate a transmission rank and a channel quality based on the received set of downlink reference signals, and transmit an indication of the transmission rank and an indication of the channel quality on an uplink control channel. In some cases, the indication of the transmission rank includes an RI, and the indication of the channel quality includes a CQI.

After transmission of the CQI and/or RI in the uplink control channel 230, the UE 215 may report a remaining channel state feedback using a precoded SRS 235. In the example of FIG. 2, the precoded SRS 235 may also be referred to as an analog PMI. In one example, to determine a beam for communicating with the base station 205, the UE 215 may estimate one or more combining coefficients based on the CQI and/or RI. In some cases, the UE 215 may be configured to perform a rank estimation and identify the one or more combining coefficients based on the rank estimation. In some cases, the UE 215 may transmit the RI and/or CQI on the uplink control channel 230 (such as PUCCH), and transmit the combining coefficients using the precoded SRS 235. In some cases, the UE 215 may transmit one or more uplink reference signals that indicate a first precoding matrix associated with the calculated transmission rank and the calculated channel quality. For example, the UE 215 may be configured to precode the SRS to transmit the combining coefficients using left eigen vectors. In such a case, the base station 205 may directly estimate the right eigen vector and identify the precoding vectors to be used for the downlink. Additionally or alternatively, as described in more detail herein, the UE 215 may convey precoding information (e.g., the calculated combining coefficients) implicitly to the base station 205 by sounding all available antennas (e.g., sending un-precoded uplink reference signals such as an un-precoded SRS 325), whereby the base station 205 may determine the appropriate precoding information (e.g., a strongest eigenvector), which may correspond with a strongest eigenvector selected at the UE 215 based on channel estimates performed by both the UE 215 and the base station 205.

Figure 3:
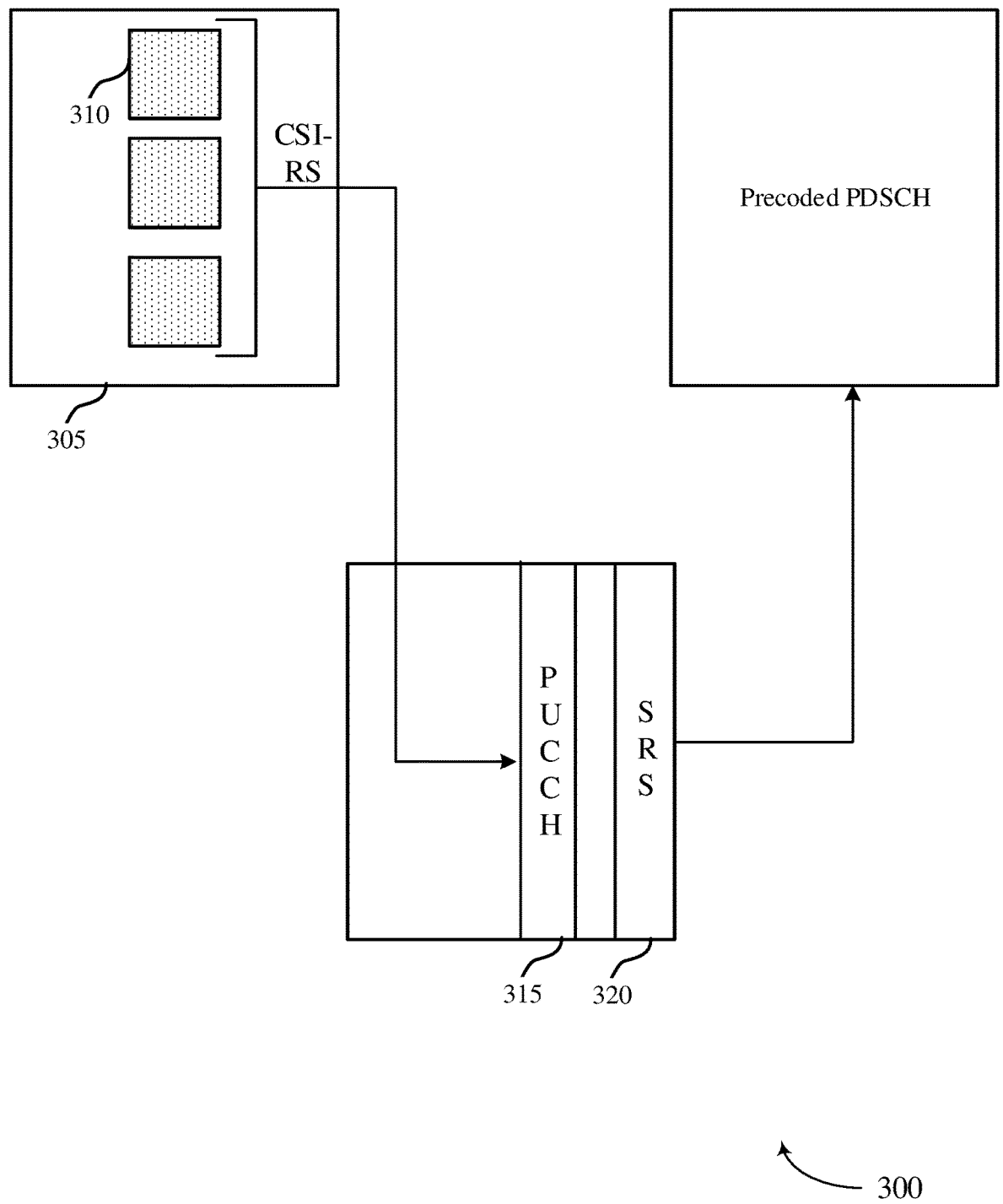
FIG. 3 illustrates an example of a channel state feedback mechanism that supports hybrid channel state feedback in accordance with aspects of the present disclosure.

FIG. 3 illustrates an example of channel state feedback mechanism 300 that supports hybrid channel state feedback in accordance with aspects of the present disclosure. In some examples, the channel state feedback mechanism 300 may implement aspects of the wireless communications systems 100 and 200. The channel state feedback mechanism 300 illustrates some, but not all, examples of types of channel state feedback mechanisms that may occur in a wireless communications system.

Existing channel state feedback mechanisms may include two approaches—an SRS-based channel state feedback mechanism and a downlink-based CSI reporting mechanism. According to the first approach, a UE (such as UE 115) may transmit an SRS sounding signal to a base station. For example, the UE may transmit the SRS sounding signal according to equation 1.

$$H_{est}=H+n \quad (1)$$

Upon receiving the SRS sounding signal, the base station may identify a downlink beam (V) for communicating with the UE. In some cases, the base station may perform an SVD operation on the received sounding signal to identify the downlink beam (V). The base station may identify a downlink beam (V) based on an uplink SINR. In one example, the base station may identify the downlink beam (V) according to equation 2.

$$V=SVD(H_{est}) \quad (2)$$

In some cases, the UE may send a CQI report associated with the downlink beam (V). According to one example, the CQI report may indicate a precoding of a CSI and/or RI. However, the first approach may suffer from uplink channel estimation error at the cell edge. In some cases, the SRS-based channel state feedback mechanism may be problematic when there are multiple UEs reporting to one base station.

According to the second approach, a UE (such as UE 115) may receive a downlink CSI-RS. Based on the received downlink CSI-RS, the UE may report a beam (e.g., by conveying a quantized matrix) which is suited for communicating with the base station (such as base station 105). In some cases, the reported beam may then be used by the base station for downlink transmission. In some cases, downlink estimation error may affect the accuracy of a chosen beam. A higher accuracy of the chosen beam may be a result of a tradeoff with CSI-RS overhead. Specifically, to reduce the downlink estimation error, the UE may be configured to report a high number of combining coefficients to the base station. However reporting the high number of combining coefficients may result in a high payload. In some examples, due to insufficient link budget, there may be limited reporting capability for a UE at a cell edge, and it may be difficult for the UE to report the high number of combining coefficients.

In some cases, the SRS-based channel state feedback mechanism may be preferred over downlink-based CSI reporting mechanism. Assuming that there are available downlink beams and downlink power to effectively estimate the channel, the first approach may perform better than the second approach at a lower path loss. However, the second approach may perform better than the first approach at a higher payload. Higher payload may be associated with a high uplink overhead. A third approach to tackle the shortcomings of the first approach and the second approach may include joint SRS-based channel state feedback mechanism and a downlink-based CSI reporting mechanism (such as Type II CSI).

According to the third approach, a UE (such as UE 115) may be configured to integrate SRS-based channel state feedback and CSI-RS port selection or reporting. In one example, the UE may utilize the SRS-based channel state feedback procedure to prune the total number of beams available for communication. The UE may then combine the pruned beams and may send the combining coefficients associated with the pruned beams, to a base station. In this example, the SRS may enable a down-selection of CSI-RS ports. Such a feedback framework may be configured to leverage precoded downlink CSI-RS for improved coverage. Additionally, the uplink beam-based channel estimation may improve SRS coverage. One or more benefits of the third approach may include reduced number of CSI-RS ports and/or overhead, and minor payload reductions. However, the joint SRS-based channel state feedback mechanism and a downlink-based CSI reporting mechanism may still be expensive in terms of high uplink payload for feedback of combining coefficients. According to one or more examples, in the third approach, a subband amplitude reporting may increase feedback overhead. Specifically, 1-bit differential subband weighting may provide about 10% gain with about 20% more feedback overhead. Thus, more robust channel state feedback mechanism may be desired.

According to one or more aspects of the present disclosure, it may be determined that the limitations for downlink-based methods are in PUSCH link budget and not in a downlink channel estimation. That is, it may be determined that the limitation is associated with an uplink reporting capability. To determine a robust channel state feedback, there may be a need to compare mutual coupling losses (MCLs) achieved for a reported payload against its SRS performance. In one example, the first approach and the third approach may be compared for 100 MHz and a same duration (such as a duration in symbols). In some cases, an amount of feedback may linearly correspond with a number of subbands. That is, a reduced number of beams may be associated with a reduced number of subbands.

According to one or more aspects of the present disclosure, the feedback requirement associated with a robust channel state feedback mechanism may be based on the following table (Table 1). Table 1 describes payload calculation depending on a number of subbands used, a number of beams, a rank of feedback, etc. In one example, one or more components for wideband and narrowband may include amplitude and phase. Additionally or alternatively, a number of bits may scale up with a number of beams and a number of subbands. According to a described technique, a link budget requirement for a robust channel state feedback mechanism may be compared to a 1-symbol SRS. 1-symbol SRS may be associated with a total power of 23 dBm across 100 MHz and all PAs. For 13 subbands, the link budget requirement for the robust channel state feedback mechanism may be 200 bits per symbol or 5.

TABLE 1

| | | | | |
|---|---|---|---|---|
| M (number of subbands) | | 13 | 13 | 13 |
| Antenna port: | | 64 | 64 | 64 |
| N1 | | 8 | 8 | 8 |
| N2 | | 4 | 4 | 4 |
| O1 | | 4 | 4 | 4 |
| O2 | | 4 | 4 | 4 |
| N_basis | | 4 | 4 | 4 |
| X(WB amplitude quantization, 8-PSK) | | 3 | 3 | 3 |
| Z (SB Phase quantization, 8-PSK) | | 3 | 3 | 3 |
| K (leading coefficients) | | 6 | 4 | 4 |
| L (number of beams) | | 4 | 3 | 2 |
| Rotation: | $\lceil \log_2(O_1 O_2) \rceil$ | 4 | 4 | 4 |
| L-beam selection | $\left\lceil \log_2\binom{N_1 N_2}{L} \right\rceil$ | 16 | 13 | 9 |
| N-basis selection | $\lceil \log_2(N\_basis) \rceil$ | 2 | 2 | 2 |
| | $\left\lceil \log_2\left(\frac{\text{\# of ports}}{2d}\right) \right\rceil$ | 3 | 3 | 3 |
| Strongest coefficient | $\lceil \log_2(2L) \rceil$ | 3 | 3 | 2 |
| WB amp: | X*(2L-1) per layer | 21 | 15 | 9 |
| Total WB payload | | 27 | 21 | 14 |
| SB amp (1SB): | 1*(K-1) per layer | 5 | 3 | 3 |
| SB phase (1SB): | 3*(K-1)+2*(2L-K) per layer | 19 | 13 | 9 |
| Total payload for rank1 (WB+13 subbands) | | 339 | 229 | 170 |
| Total payload for rank2 (WB+13 subbands) | | 651 | 437 | 326 |

In some cases, an uplink throughput requirement for a robust channel state feedback mechanism may be calculated using MCL values. In the dense urban scenario, 5th percentile of the MCL may be 130 dB, 5th percentile of the uplink spectral efficiency may be 0.193 bps/Hz, and 5th percentile of the downlink spectral efficiency may be 0.35 bps/Hz. According to one or more examples, the link throughput requirement for the robust channel state feedback mechanism may be calculated using the following table (Table 2).

According to the first row of Table 2, the UE may feedback by combining coefficient for all subbands in 100 MHz. That is, the UE may transmit feedback for 275 RBs, which may include transmitting 6627 bits and 2.20 spectral efficiency. To support an uplink spectral efficiency of 0.193 bps/Hz, the UE may transmit feedback for 20 subbands. As described in Table 2, assuming a 1-symbol PUSCH and an additional 3 dB loss, a payload increase based on a number of subbands for a defined feedback and a threshold MCL (130 dB) may allow 20 subbands. To perform channel state feedback efficiently, the UE may only transmit CQI-RI feedback in an uplink control channel and transmit the PMI (such as the beam combinations). In some cases, the UE may transmit the CQI-RI using 8 bits. In one example, the 8 bits in may be associated with 266 kbps, which may be supported on the uplink within the 5th percentile of the MCL (such as MCL=130 dB).

TABLE 2

| Number of SBs in 100 MHz | Rank 1 CSI feedback requirement (bits) | UL SE required (bps/Hz) | MCL improvement needed for PUSCH (dB) |
|---|---|---|---|
| 275 | 6627 | 2.20 | 10.6 |
| 65 | 1587 | 0.529 | 4.4 |
| 20 | 507 | 0.169 | −0.5 |
| 10 | 267 | 0.089 | −3.3 |
| 5 | 147 | 0.049 | −6.0 |

According to one or more performance analyses, it may be determined that the first approach (such as the SRS-based channel state feedback mechanism) may have a better performance (8-10 dB) than the third approach (such as joint SRS-based channel state feedback mechanism and a downlink-based CSI reporting mechanism). According to one or more aspects, the third approach (or Type II CSI) may be more expensive than the first approach. In some cases, an energy normalized comparison indicates that 8-10 dB lower MCL is needed for the third approach. In some cases, a precoded SRS and an OFDM maximum power reduction may have a better performance than the first approach. As previously described, the SRS-only procedures may still have drawbacks. In one example, link adaptation procedure may be triggered by SRS across all ports, and the UE may not provide a rank selection to the base station. Thus, there exists a need for a channel feedback procedure that is associated with a lower latency.

According to one or more aspects of the present disclosure, a hybrid-analog channel state feedback procedure may be implemented. As described with reference to FIG. 3, a UE may perform a CSI-acquisition. The UE may then report CQI and/or RI using a small payload in an uplink control channel (such as PUCCH). In some implementations, the UE may report a remaining channel state feedback using a precoded SRS (such as an analog PMI). In one example, the UE may estimate one or more combining coefficients based on the CSI-RS. In some cases, the UE may be configured to perform a rank estimation and identify the one or more combining coefficients based on the rank estimation. In some cases, the UE may transmit the RI and/or CQI on the PUCCH, and transmit the combining coefficients using the SRS. In some cases, the UE may be configured to precode the SRS to transmit the combining coefficients (such as PMI). In some cases, the UE may use left eigen vectors to precode the SRS. In such a case, the base station may directly receive the precoding vectors to be used for the downlink.

As depicted in the example of FIG. 3, at 305, a UE (such as UE 115) receives a set of downlink reference signals associated with a downlink channel in a downlink slot 305. In some cases, the set of downlink reference signals may include CSI-RS. The UE may then calculate a transmission rank and a channel quality based on the received set of downlink reference signals. In some cases, the UE may estimate H*B across precoded CSI-RS ports 310 to estimate RI and/or CQI. According to one or more aspects of the present disclosure, the UE may measure the channel associated with precoded CSI-RS ports 310 according to equation 3.

$$\hat{H} = (y_{DL,CSI-RS} p_{CSI-RS}^T) = H^*B \qquad (3)$$

The UE may transmit an indication of the transmission rank and an indication of the channel quality on an uplink control channel. In some cases, the indication of the transmission rank includes an RI and the indication of the channel quality includes a CQI. As depicted in the example of FIG. 3, the UE may transmit the indication of the transmission rank and the indication of the channel quality on the PUCCH 315. According to one example, the UE may use the channel estimate H*B to determine a SVD of a precoded channel. Specifically, the UE may calculate an eigenvector corresponding to the SVD of a matrix combination corresponding to the channel estimate H*B. In some cases, the UE may determine a rank and corresponding eigenvectors at the transmitter and receiver according to equation 4.

$$H^*B = UDV^H \qquad (4)$$

To determine the right and left eigenvectors, the UE may denote down-selected eigen channels as $D_{CQI}$ and receive vector(s) as $U_{CQI}$. According to one or more examples, the UE may determine a PMI $V_{CQI}$ corresponding to the UE's reported RI and CQI. In some cases, the PMI $V_{CQI}$ may be a subset of the vectors and in $UDV^H$ in equation 4. In some cases, the RI may indicate a size of the subset. Once the UE reports RI and CQI the PUCCH 315, the UE may then convey the calculated PMI $V_{CQI}$ associated with these reports.

In one example, the UE may transmit one or more uplink reference signals 320 that indicate a first precoding matrix associated with the calculated transmission rank and the calculated channel quality. For example, the UE may precode SRS according to a linear receiver $U_{CQI}$. In some cases, the UE may precode the SRS based on the SVD which was used for deriving the CQI. Upon receiving the precoded SRS, the base station may correspondingly estimate the precoded channel which has been partially decomposed. In some cases, the rank of the channel may be reduced to be consistent with RI. In some examples, the base station may estimate the precoded channel based on equation 5.

$$\hat{H}^T U_{CQI} = (y_{UL} U_{CQI}^H p_{SRS}^H) \qquad (5)$$

The remaining SVD of the channel at the base station may indicate the PMI $V_{CQI}^H$ used for the UE's calculation of CQI and RI. In some examples, the base station may estimate the remaining SVD of this channel based on equation 6.

$$\text{SVD}(U_{CQI}^H H) = D_{CQI} V_{CQI}^H \qquad (6)$$

In some cases, the base station may be configured to apply channel estimation to the precoded channel, H*B rather than the channel directly. In this case, such a precoding may also improve the uplink channel estimation at the base station since it is calculated per beam instead of per antenna. In some cases, if the UE precodes $U_{CQI} D_{CQI}^{-1}$, then the network may obtain the PMI $V_{CQI}^H$ directly from pre-coded channel estimation based on the SRS.

According to one or more aspects of the present disclosure, precoding of SRS may be based on CSI-RS. In some cases, the RI and/or CQI report may be coupled with the SRS and reported to the base station. In some cases, the CQI may be based on RI and downlink-oriented SRS (such as analog PMI). In some examples, the CQI and/or RI may be transmitted on PUCCH, and the base station may be configured to determine a downlink beam based on computing a precoding that corresponds to the CQI and/or RI. In some instances, the PUCCH may be transmitted prior to the transmission of the SRS. In some cases, the SRS may be transmitted in a different block. In some cases, the SRS may be frequency hopped and may be transmitted over several slots.

In some cases, the UE may transmit the indication of the transmission rank and the indication of the channel quality in a CSI report. In some examples, the CSI report may be periodic, aperiodic, or a combination thereof. According to some examples, the periodic CSI report may be associated with one or more periodic uplink reference signals, a periodicity of the periodic CSI report may be different from a periodicity of the one or more periodic uplink reference signals, the periodic CSI report may be associated with one or more aperiodic uplink reference signals, the aperiodic CSI report may be associated with the one or more aperiodic uplink reference signals, or a combination thereof. As previously discussed, the uplink reference signals may include SRS. In some cases, a time-gap between the periodic CSI report and the periodic SRS may be predefined. In some cases, the aperiodic CSI report may be transmitted within a maximum time threshold of the aperiodic uplink reference signal transmissions. That is, if an aperiodic SRS may be transmitted in a slot "n" the associated aperiodic CSI-RS may be transmitted no later than slot "n-m." In some cases, the PMI may be updated when one or more aperiodic uplink reference signals (such as aperiodic SRS) or one or more periodic uplink reference signals (such as P-SRS) is received. In some cases, a CSI-request may trigger a downlink-oriented CSI-RS.

According to one or more aspects of the present disclosure, the RI and/or CQI may be transmitted on a 8-bit PUCCH. In one example, a wideband SRS may be associated with a higher MCL than a narrowband SRS (i.e., only for the number of ports indicated by RI). According to one or more aspects of the present disclosure, the UE may provide a rank selection to the base station, and the precoded SRS can convey reception information to the base station. In some cases, the CSI-RS may be precoded for efficient multiplexing among multiple UEs. Additionally or alternatively, because the UE determines the number of SRS ports based on RI, not all SRS ports are sounded, thereby reducing latency in the procedure. In some cases, the CSI-RS may be precoded to cover sector with beams swept.

In some cases, the SRS may be provisioned for a maximum number of ports that the UE may select. In such cases, the base station may increase a transmission margin by indicating that SRS be triggered at a different slot. In this way, if there are multiple users, then the base station may budget for the number of ports for each UE. In one instance, the UE may receive a transmission configuration for transmitting the one or more uplink reference signals, where a number of transmission ports available for transmitting the one or more uplink reference signals is less than a total number of transmission ports supported by the UE. In such cases, the UE may adjust an uplink power control UE based on the received transmission configuration and based on the number of transmission ports available for transmitting the one or more uplink reference signals being less than the total number of transmission ports supported by the UE. Additionally or alternatively, the UE may repeat a transmission of the one or more uplink reference signals from a subset of the total number of transmission ports supported by the UE that exceed a quality threshold based on the received transmission configuration and based on the number of transmission ports available for transmitting the one or more uplink reference signals being less than the total number of transmission ports supported by the UE. For example, if a base station configures a UE to transmit an SRS along 3 ports, and if the UE calculated the RI to be for 1 port, then the UE can send the SRS only on 1 port. Alternatively, the UE can repeat the SRS 3 times. The power for sending the SRS may be different in each case. In some cases, the base station may combine across the repeated SRSs, and may efficiently estimate the beam to be used for a downlink transmission.

According to one or more aspects of the present disclosure, the SRS precoder selection may be implicit or explicit. As previously described, for explicit selection, the base station may estimate a channel and the channel estimates may be converted directly to PMI. Additionally the UE may determine precoding for SRS according to eigenvectors from H*B estimated on downlink. The UE may transmit CSI-RS prior to transmitting the precoded SRS, and the base station may utilize the received CSI-RS to precode B in the uplink channel estimation. For explicit SRS precoder selection, the UE may be configured to include a beamforming or a channel whitening. In some cases, instead of transmitting eigenvectors, the UE may be configured to transmit a single port and beamform for that port.

According to some aspects of explicit SRS precoder selection, the UE may be configured to perform transmit-antenna switching. Such transmit-antenna switching may be supported by super-imposing all port components per antenna transmission. In some cases, the UE may add an error margin to the calculated transmission rank and the calculated channel quality based on an uplink power control indication for the UE. That is, the UE may determine an effectiveness of the channel estimate based on an uplink power control. For example, if the channel estimate is a noisy, the UE may include a prediction of data rate with a threshold margin in the CQI report. In some cases, the threshold margin may be based on a difference between the channel estimate at the base station and the channel estimate at the UE. In some cases of explicit SRS precoder selection, the CQI/RI may take into account an advanced reception technique for the analog PMI.

For implicit selection of SRS precoder, a base station may estimate a channel and may determine one or more eigenvectors which correspond to CQI and/or RI based on an unprecoded SRS. For example, the UE may transmit the one or more uplink reference signals (such as SRS) using each antenna of the UE (or using at least a subset of antennas of the UE), and the base station may estimate the channel based on a strongest eigenvector of a set of eigenvectors calculated by the UE. In one example, the UE may be configured to sound antennas (e.g., un-precoded) with CQI and/or RI which are based on prediction of a channel associated with the base station and a corresponding SVD. The UE and the base station may be configured to implicitly calculate the eigenvectors from the estimated channel. In one example, the UE may sound every antenna separately with a dedicated port and the base station may determine the strongest eigenvectors as indicated by RI. In implicit selection of SRS precoder, the strongest eigenvectors determined by the base station is consistent with the strongest eigenvectors determined by the UE. According to one or more aspects, for implicit selection of SRS precoder, every antenna port on the UE may be sounded. However, for explicit selection of SRS precoder, the UE may sound only the strongest precoded eigenvectors as indicated by the RI.

In some examples of narrowband uplink in wideband TDD, the UE may reduce the uplink bandwidth relative to the downlink bandwidth. In some cases, the UE may be configured to track differences among the downlink in each subband, and adjust the SRS within the narrowband uplink according to the differences for each subband.

In some examples of narrowband uplink in wideband FDD, the UE may be configured to parameterize an impact of precoded SRS in uplink band to precoder in downlink band. This may result in adjustment of FDD band separation. In the example of narrowband uplink in wideband FDD, the uplink band and downlink band may not be overlapping and there may be minor discrepancies in the channels. However, the relatively small duplex separation can still allow the UE to assume that the scatters are identical and that the rank distribution is similar between the uplink and downlink.

The described techniques may be applicable beyond MIMO. Specifically, the described techniques may be applicable to non-standard antenna arrays, mTRP, DAS, distributed MIMO, etc.

Figure 4A:
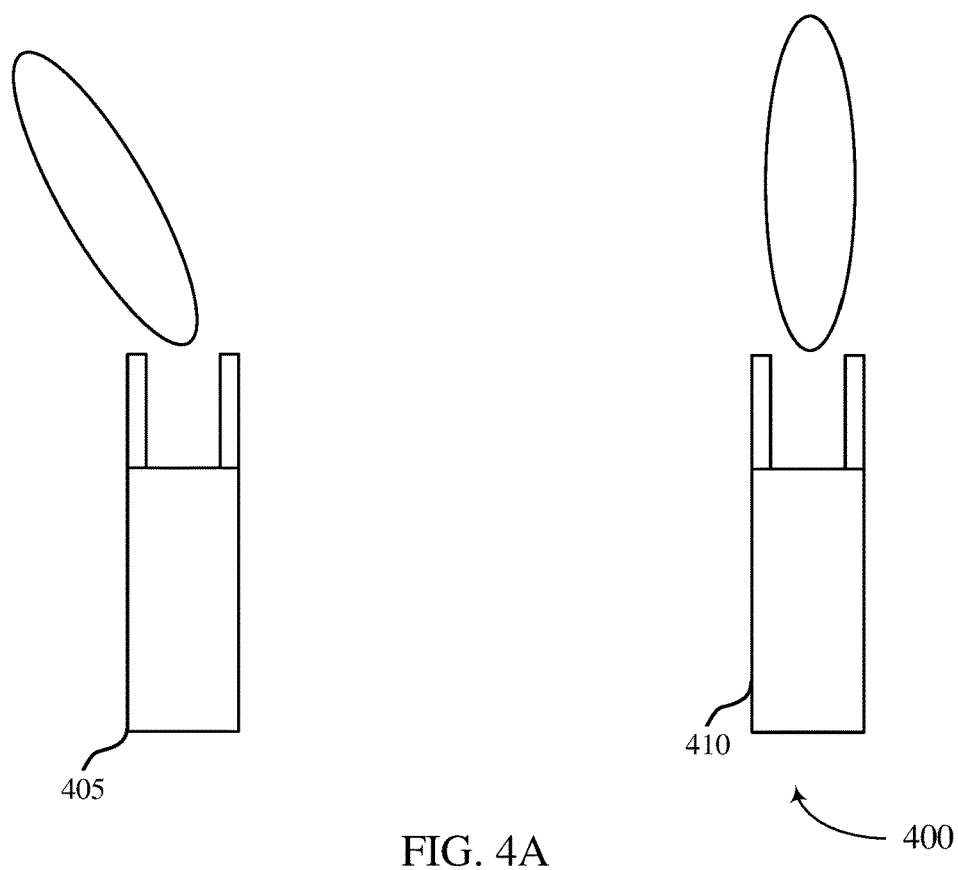
FIGS. 4A and 4B illustrate examples of sounding reference signal (SRS) sounding procedures that supports hybrid channel state feedback in accordance with aspects of the present disclosure.

FIG. 4A illustrates an example of SRS sounding procedure 400 that supports hybrid channel state feedback in accordance with aspects of the present disclosure. In some examples, the SRS sounding procedure 400 may implement aspects of the wireless communications systems 100 and 200. The SRS sounding procedure 400 illustrates an example for a technique for reporting analog PMI to the base station. In the example of FIG. 4A, a first SRS (such as SRS 1) may be precoded according to matrix [1,−1], and may be transmitted using the first antenna 405. Similarly, a second SRS (such as SRS 2) may be precoded according to matrix [1,1], and may be transmitted using the second antenna 410. FIG. 4A depicts a case where the UE performs a sounding of a 2-chain precoded SRS (analog PMI) across 2-symbols.

Figure 4B:
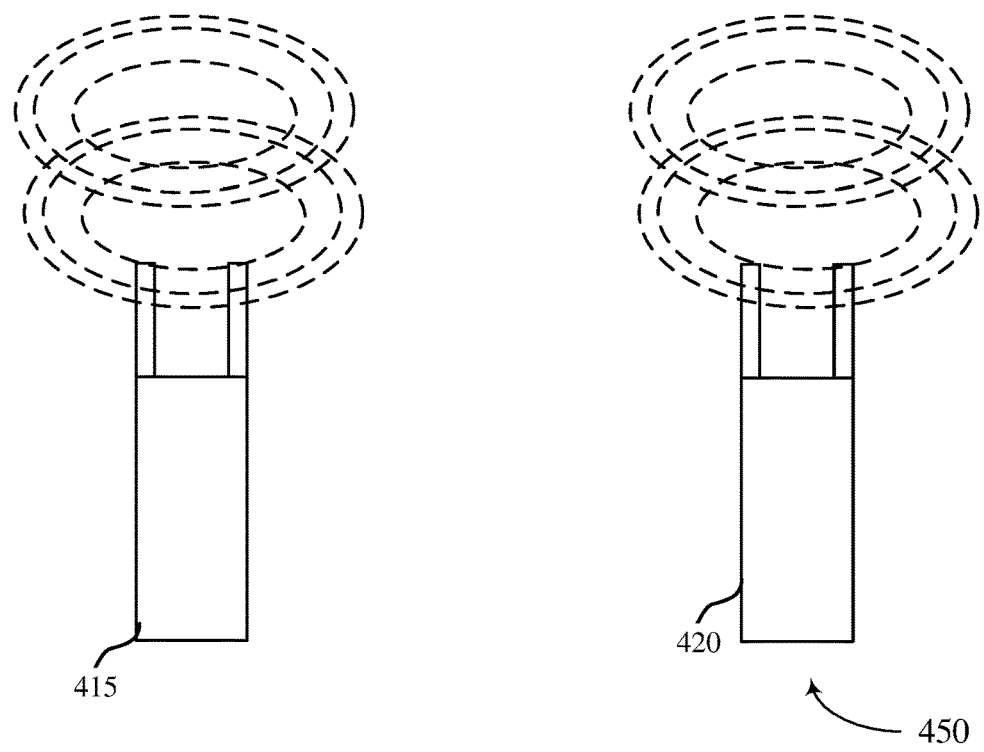

FIG. 4B illustrates an example of SRS sounding procedure 450 that supports hybrid channel state feedback in accordance with aspects of the present disclosure. In some examples, the SRS sounding procedure 450 may implement aspects of the wireless communications systems 100 and 200. The SRS sounding procedure 450 illustrates an example for a technique for reporting analog PMI to the base station by UEs capable of handling single transmit chains. Using the same example as FIG. 4A, a first SRS (such as SRS 1) may be precoded according to matrix [1,−1], and a second SRS (such as SRS 2) may be precoded according to matrix [1,1]. In some cases, multiple SRS beams per stream may be multiplexed (e.g., TDM). For single transmit chain UEs, elements of each beam may be switched across antennas. For example, sound components of streams along antenna 415 may be transmitted prior to antenna 420. In one instance, the UE may decompose the precoding matrices. For example, the UE may decompose the matrix [1,−1] and the matrix [1,1]. In some cases, the UE may multiplex first and second components of the precoding matrix. In other words, the UE may be configured to decompose and multiplex portions of an SRS. In the example of FIG. 4B, the relative amplitude of the first SRS and the second SRS is in the same direction for the first antenna 415. Additionally, the relative amplitude of the first SRS and the second SRS is in the opposite direction for the second antenna 420. FIG. 4B depicts a case where the UE performs a sounding of a 1-chain precoded SRS (analog PMI) across 2-symbols.

Figure 5:
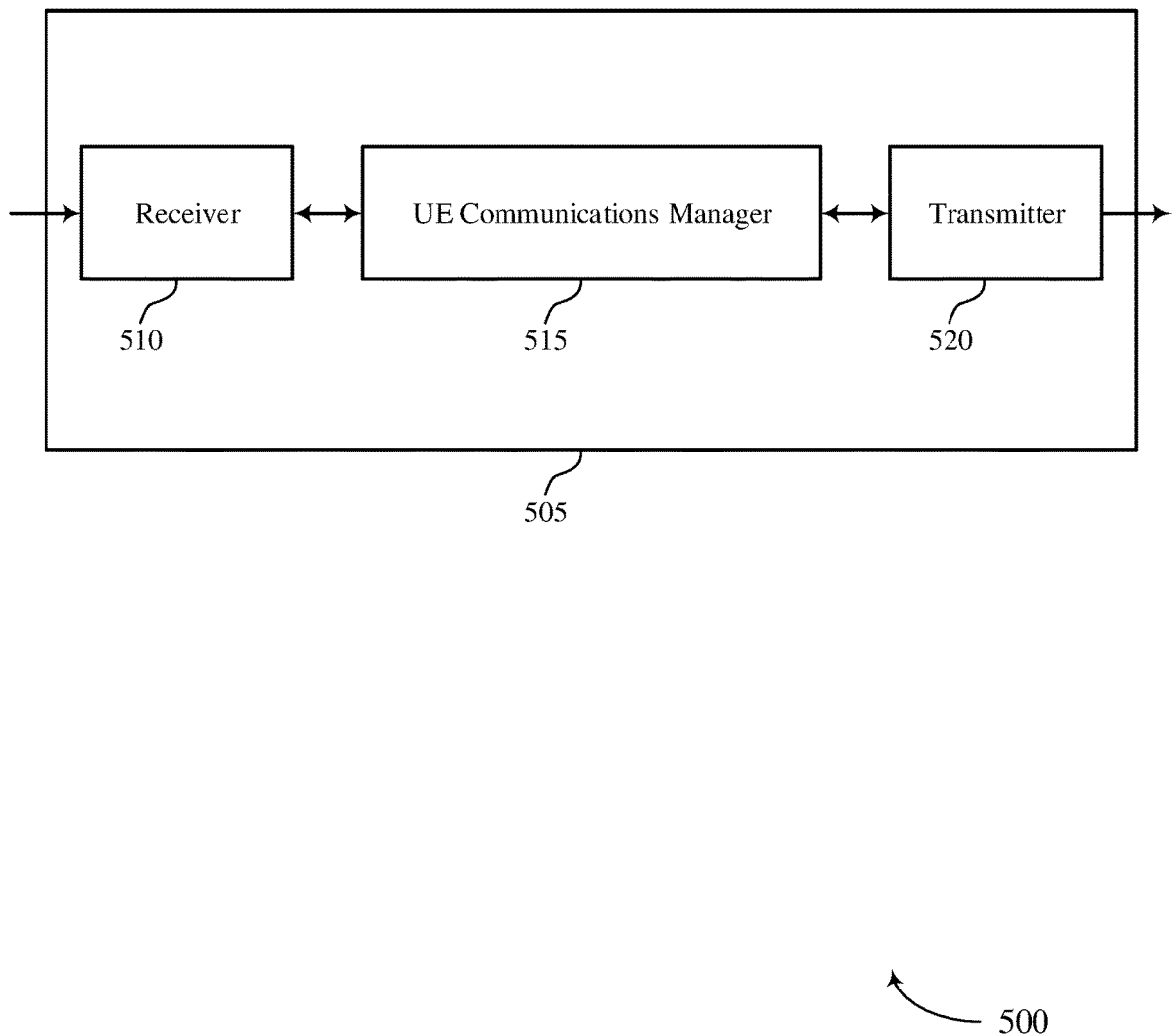
FIGS. 5 and 6 show block diagrams of devices that support hybrid channel state feedback in accordance with aspects of the present disclosure.

FIG. 5 shows a block diagram 500 of a device 505 that supports hybrid channel state feedback in accordance with aspects of the present disclosure. The device 505 may be an example of aspects of a UE 115 as described herein. The device 505 may include a receiver 510, an UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to hybrid channel state feedback, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may receive a set of downlink reference signals associated with a downlink channel, calculate a transmission rank and a channel quality based on the received set of downlink reference signals, transmit an indication of the transmission rank and an indication of the channel quality on an uplink control channel, and transmit one or more uplink reference signals that indicate a first precoding matrix associated with the calculated transmission rank and the calculated channel quality. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
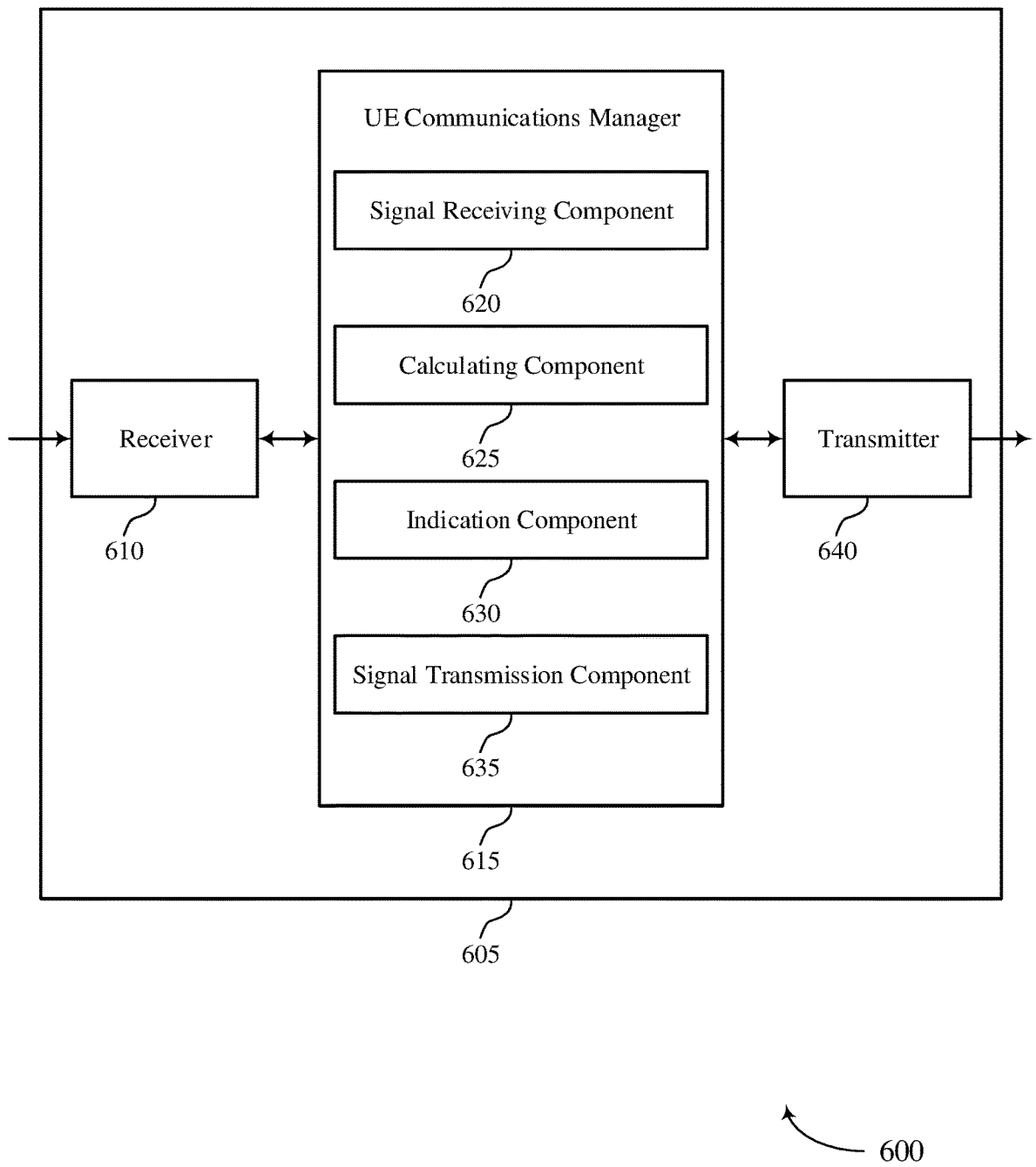

FIG. 6 shows a block diagram 600 of a device 605 that supports hybrid channel state feedback in accordance with aspects of the present disclosure. The device 605 may be an example of aspects of a device 505, or a UE 115 as described herein. The device 605 may include a receiver 610, an UE communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to hybrid channel state feedback, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a signal receiving component 620, a calculating component 625, an indication component 630, and a signal transmission component 635. The UE communications manager 615 may be an example of aspects of the UE communications manager 810 described herein.

The signal receiving component 620 may receive a set of downlink reference signals associated with a downlink channel. The calculating component 625 may calculate a transmission rank and a channel quality based on the received set of downlink reference signals. The indication component 630 may transmit an indication of the transmission rank and an indication of the channel quality on an uplink control channel. The signal transmission component 635 may transmit one or more uplink reference signals that indicate a first precoding matrix associated with the calculated transmission rank and the calculated channel quality.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
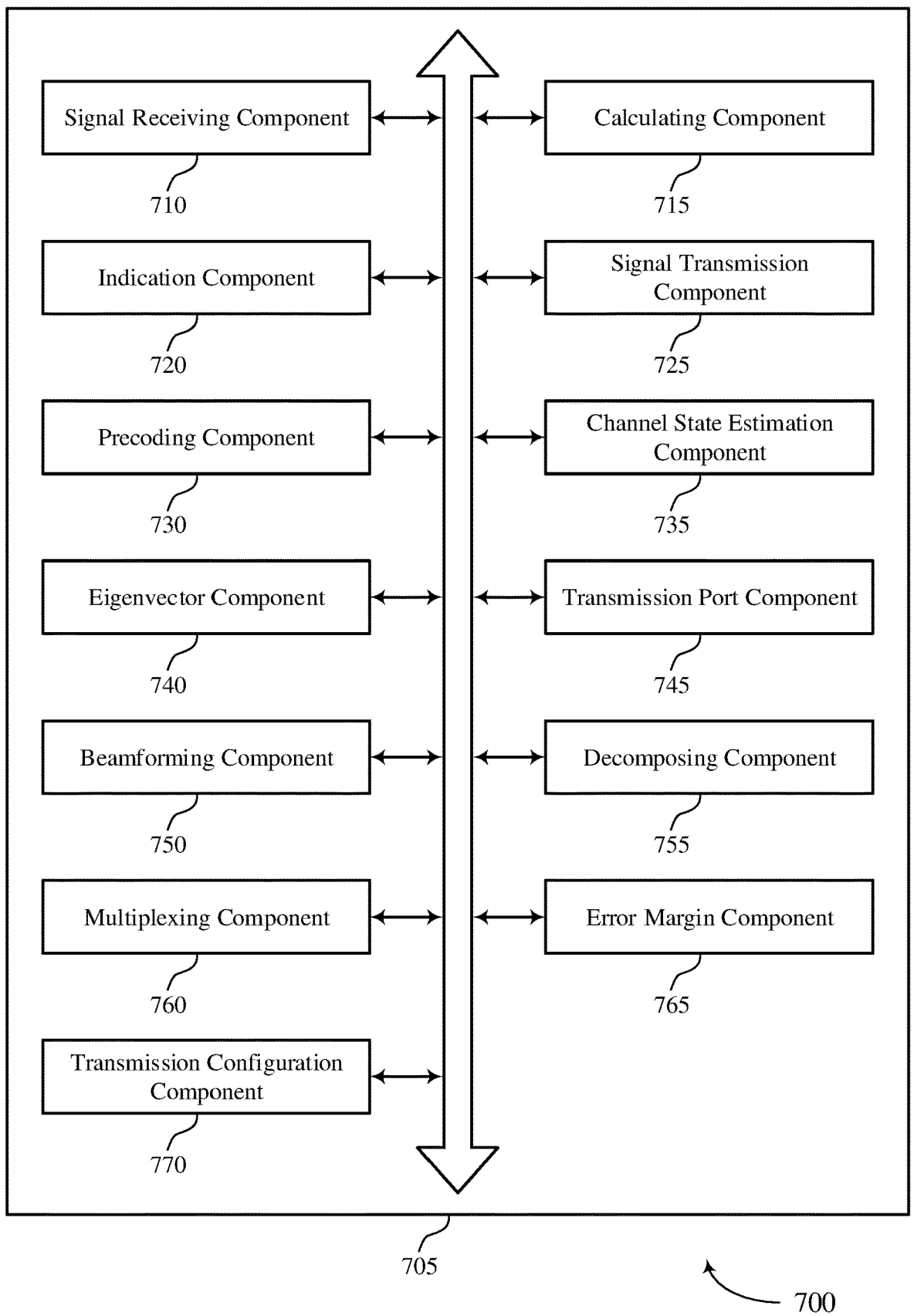
FIG. 7 shows a block diagram of a UE communications manager that supports hybrid channel state feedback in accordance with aspects of the present disclosure.

FIG. 7 shows a block diagram 700 of a UE communications manager 705 that supports hybrid channel state feedback in accordance with aspects of the present disclosure. The UE communications manager 705 may be an example of aspects of a UE communications manager 515, a UE communications manager 615, or a UE communications manager 810 described herein. The UE communications manager 705 may include a signal receiving component 710, a calculating component 715, an indication component 720, a signal transmission component 725, a precoding component 730, a channel state estimation component 735, an eigenvector component 740, a transmission port component 745, a beamforming component 750, a decomposing component 755, a multiplexing component 760, an error margin component 765, and a transmission configuration component 770. Each of these modules may communicate, directly or indirectly, with one another (e.g., via one or more buses).

The signal receiving component 710 may receive a set of downlink reference signals associated with a downlink channel. In some cases, the set of downlink reference signals includes CSI-RS. In some cases, the CSI-RS are precoded signals. The calculating component 715 may calculate a transmission rank and a channel quality based on the received set of downlink reference signals.

The indication component 720 may transmit an indication of the transmission rank and an indication of the channel quality on an uplink control channel. In some cases, the uplink control channel includes a PUCCH. In some cases, the indication of the transmission rank includes an RI. In some cases, the indication of the channel quality includes a CQI. In some examples, the indication component 720 may transmit the indication of the transmission rank and the indication of the channel quality in a CSI report, where the CSI report is periodic, aperiodic, or a combination thereof.

In some cases, the periodic CSI report is associated with one or more periodic uplink reference signals, a periodicity of the periodic CSI report is different from a periodicity of the one or more periodic uplink reference signals, the periodic CSI report is associated with one or more aperiodic uplink reference signals, the aperiodic CSI report is associated with the one or more aperiodic uplink reference signals, or a combination thereof. In some cases, the aperiodic CSI report is transmitted within a maximum time threshold of the aperiodic uplink reference signal transmission.

The signal transmission component 725 may transmit one or more uplink reference signals that indicate a first precoding matrix associated with the calculated transmission rank and the calculated channel quality. In some examples, the signal transmission component 725 may transmit the one or more uplink reference signals using at least a subset of antennas of the UE, where the first precoding matrix is based on a strongest eigenvector of a set of eigenvectors calculated by the UE. In some cases, the subset of the antennas of the UE may include all antennas of the UE.

In some examples, the signal transmission component 725 may transmit the first component of the first precoding matrix using a first antenna and the second component of the first precoding matrix using a second antenna such that a superimposition of the first and second components indicates the first precoding matrix. In some cases, the indication of the first precoding matrix includes a PMI. In some cases, the one or more uplink reference signals includes one or more SRS.

The precoding component 730 may precode the uplink reference signal with a second precoding matrix, where the second precoding matrix is based on the received set of downlink reference signals. The channel state estimation component 735 may estimate a channel state for the downlink channel based on the received set of downlink reference signals. The eigenvector component 740 may calculate an eigenvector corresponding to an SVD of a matrix combination corresponding to the estimated channel state, where precoding the uplink reference signal is further based on the calculated eigenvector.

The transmission port component 745 may determine a number of transmission ports based on the calculated transmission rank, where transmitting the one or more uplink reference signals is based on the determined number of transmission ports. In some cases, the determined number of transmission ports is less than a total number of transmission ports supported by the UE.

The beamforming component 750 may beamform the one or more uplink reference signals, where the first precoding matrix is indicated based on a direction of the beamforming. The decomposing component 755 may decompose the first precoding matrix. The multiplexing component 760 may multiplex first and second components of the first precoding matrix. The error margin component 765 may add an error margin to the calculated transmission rank and the calculated channel quality based on an uplink power control indication for the UE.

The transmission configuration component 770 may receive a transmission configuration for transmitting the one or more uplink reference signals, where a number of transmission ports available for transmitting the one or more uplink reference signals is less than a total number of transmission ports supported by the UE. In some examples, the transmission configuration component 770 may adjust an uplink power control at the UE based on the received transmission configuration and based on the number of transmission ports available for transmitting the one or more uplink reference signals being less than the total number of transmission ports supported by the UE.

In some examples, the transmission configuration component 770 may repeat a transmission of the one or more uplink reference signals from a subset of the total number of transmission ports supported by the UE that exceed a quality threshold based on the received transmission configuration and based on the number of transmission ports available for transmitting the one or more uplink reference signals being less than the total number of transmission ports supported by the UE.

Figure 8:
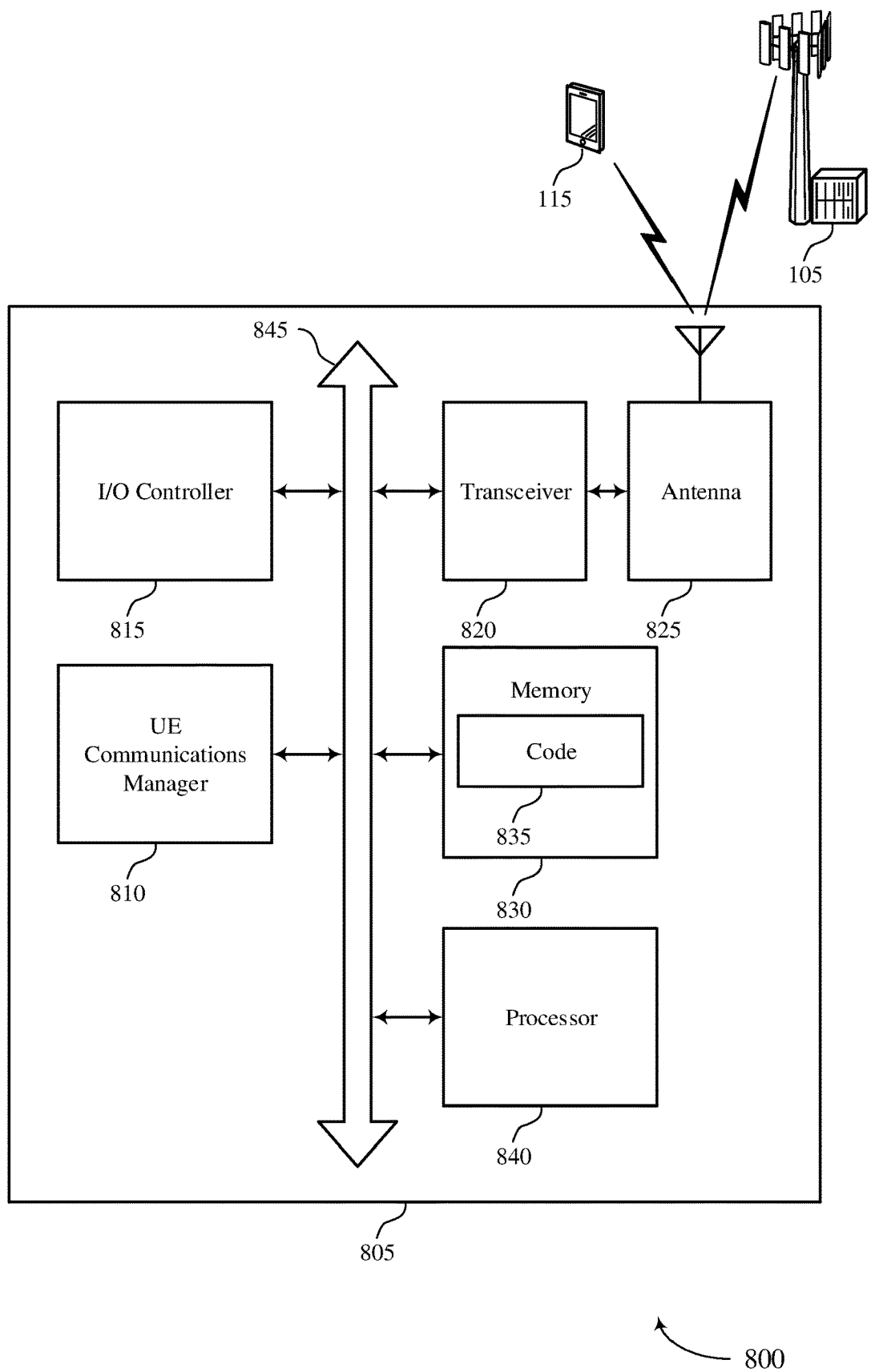
FIG. 8 shows a diagram of a system including a device that supports hybrid channel state feedback in accordance with aspects of the present disclosure.

FIG. 8 shows a diagram of a system 800 including a device 805 that supports hybrid channel state feedback in accordance with aspects of the present disclosure. The device 805 may be an example of or include the components of device 505, device 605, or a UE 115 as described herein. The device 805 may include components for bi-directional voice and data communications including components for transmitting and receiving communications, including an UE communications manager 810, an I/O controller 815, a transceiver 820, an antenna 825, memory 830, and a processor 840. These components may be in electronic communication via one or more buses (e.g., bus 845).

The UE communications manager 810 may receive a set of downlink reference signals associated with a downlink channel, calculate a transmission rank and a channel quality based on the received set of downlink reference signals, transmit an indication of the transmission rank and an indication of the channel quality on an uplink control channel, and transmit one or more uplink reference signals that indicate a first precoding matrix associated with the calculated transmission rank and the calculated channel quality.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting hybrid channel state feedback).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
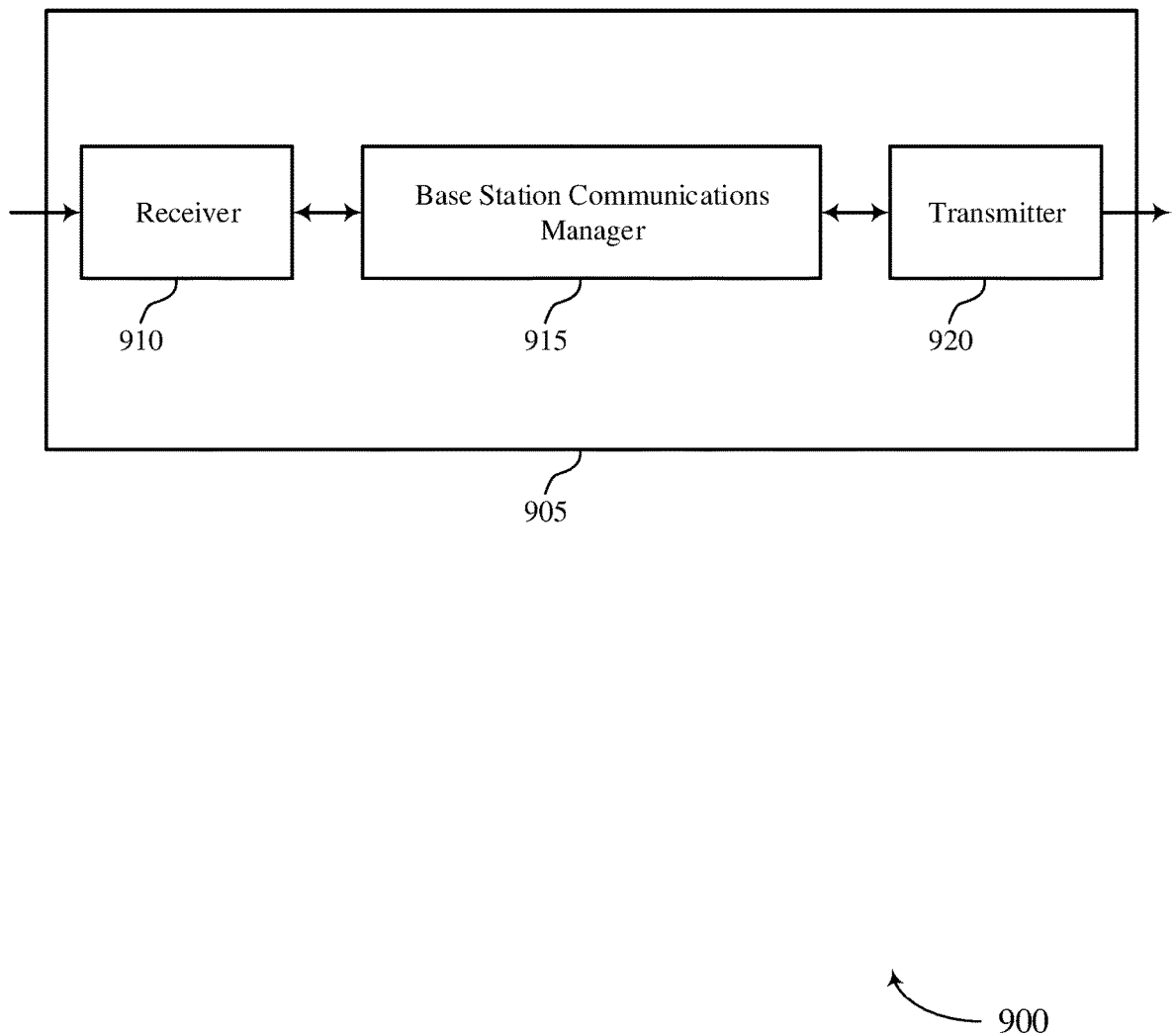
FIGS. 9 and 10 show block diagrams of devices that support hybrid channel state feedback in accordance with aspects of the present disclosure.

FIG. 9 shows a block diagram 900 of a device 905 that supports hybrid channel state feedback in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to hybrid channel state feedback, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may transmit a set of downlink reference signals associated with a downlink channel, receive an indication of a transmission rank and an indication of a channel quality, where the transmission rank and the channel quality are based on the transmitted set of downlink reference signals, receive one or more uplink reference signals that indicate a first precoding matrix associated with the transmission rank and the channel quality, and determine the first precoding matrix associated with the transmission rank and the channel quality based on the received one or more uplink reference signals. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
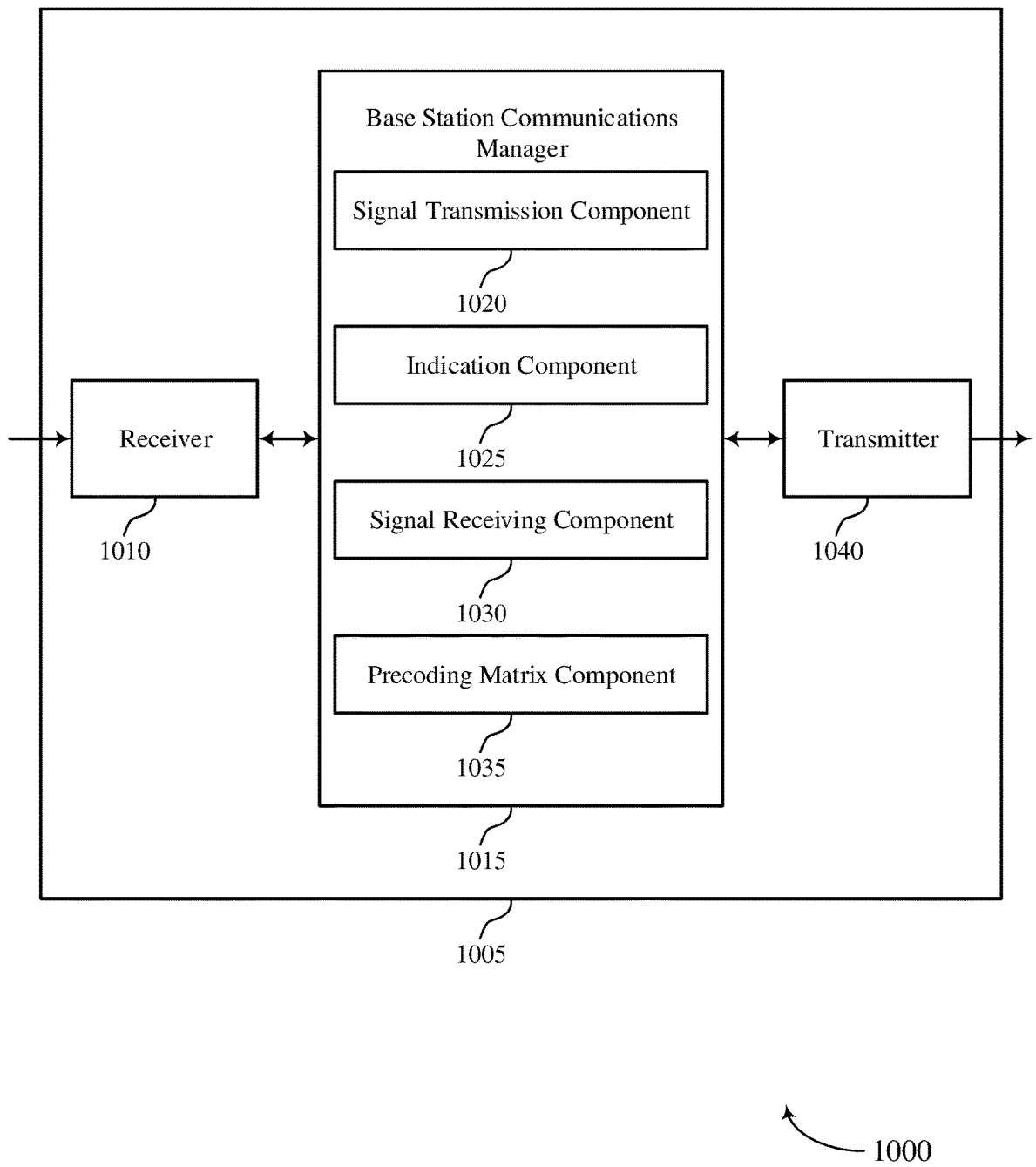

FIG. 10 shows a block diagram 1000 of a device 1005 that supports hybrid channel state feedback in accordance with aspects of the present disclosure. The device 1005 may be an example of aspects of a device 905, or a base station 105 as described herein. The device 1005 may include a receiver 1010, a base station communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to hybrid channel state feedback, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a signal transmission component 1020, an indication component 1025, a signal receiving component 1030, and a precoding matrix component 1035. The base station communications manager 1015 may be an example of aspects of the base station communications manager 1210 described herein.

The signal transmission component 1020 may transmit a set of downlink reference signals associated with a downlink channel. The indication component 1025 may receive an indication of a transmission rank and an indication of a channel quality, where the transmission rank and the channel quality are based on the transmitted set of downlink reference signals. The signal receiving component 1030 may receive one or more uplink reference signals that indicate a first precoding matrix associated with the transmission rank and the channel quality. The precoding matrix component 1035 may determine the first precoding matrix associated with the transmission rank and the channel quality based on the received one or more uplink reference signals.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
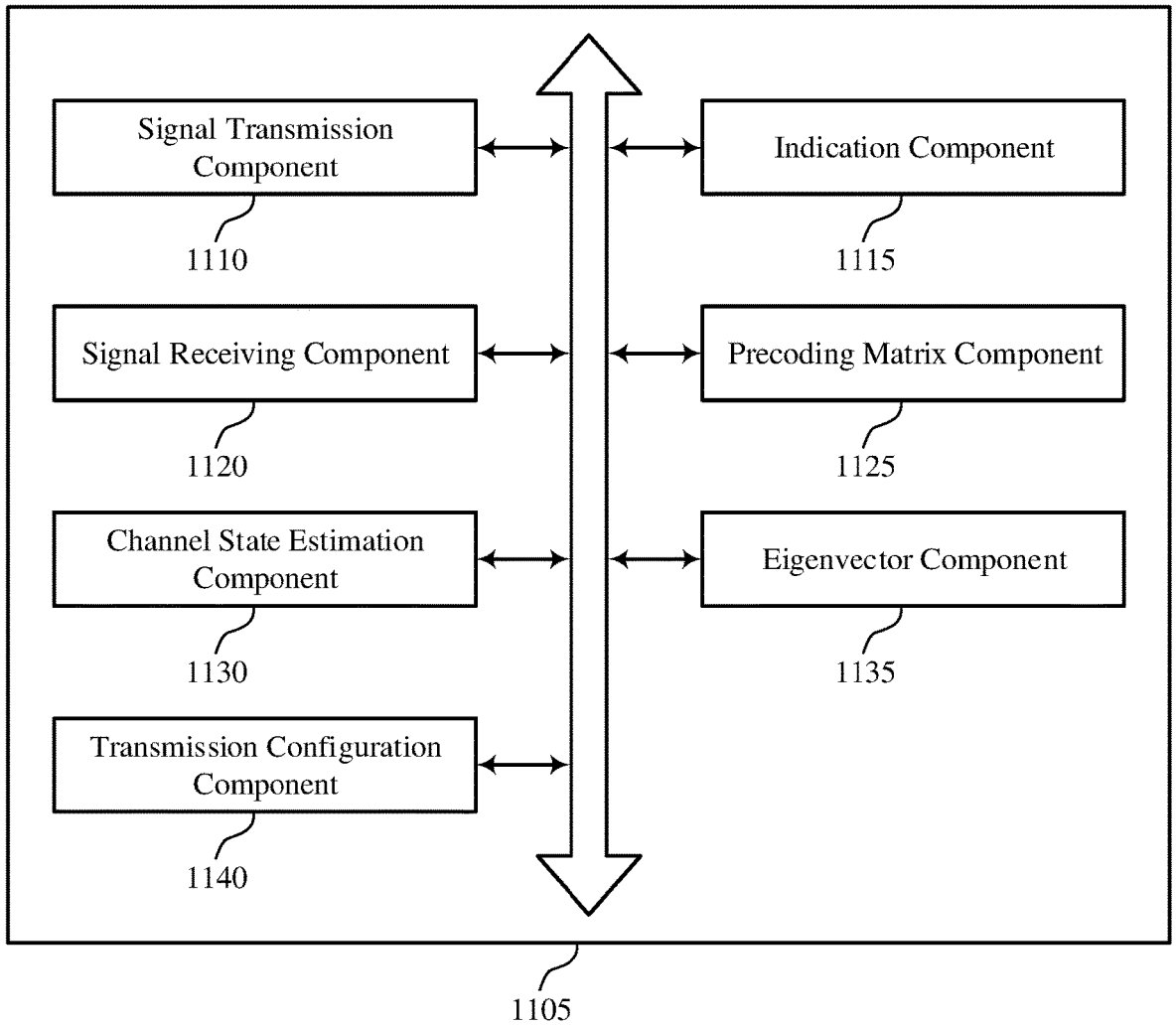
FIG. 11 shows a block diagram of a base station communications manager that supports hybrid channel state feedback in accordance with aspects of the present disclosure.

FIG. 11 shows a block diagram 1100 of a base station communications manager 1105 that supports hybrid channel state feedback in accordance with aspects of the present disclosure. The base station communications manager 1105 may be an example of aspects of a base station communications manager 915, a base station communications manager 1015, or a base station communications manager 1210 described herein. The base station communications manager 1105 may include a signal transmission component 1110, an indication component 1115, a signal receiving component 1120, a precoding matrix component 1125, a channel state estimation component 1130, an eigenvector component 1135, and a transmission configuration component 1140. Each of these modules may communicate, directly or indirectly, with one another (e.g., via one or more buses).

The signal transmission component 1110 may transmit a set of downlink reference signals associated with a downlink channel. In some examples, the signal transmission component 1110 may precode the set of downlink reference signals.

The indication component 1115 may receive an indication of a transmission rank and an indication of a channel quality, where the transmission rank and the channel quality are based on the transmitted set of downlink reference signals. In some examples, the indication component 1115 may receive the indication of the transmission rank and the indication of the channel quality in a CSI report, where the CSI report is periodic, aperiodic, or a combination thereof. In some cases, the indication of the transmission rank includes an RI. In some cases, the indication of the channel quality includes a CQI.

In some cases, the periodic CSI report is associated with one or more periodic uplink reference signals, a periodicity of the periodic CSI report is different from a periodicity of the one or more periodic uplink reference signals, the periodic CSI report is associated with one or more aperiodic uplink reference signals, the aperiodic CSI report is associated with the one or more aperiodic uplink reference signals, or a combination thereof. In some cases, the aperiodic CSI report is transmitted within a maximum time threshold of the aperiodic uplink reference signal transmission.

The signal receiving component 1120 may receive one or more uplink reference signals that indicate a first precoding matrix associated with the transmission rank and the channel quality. In some examples, the signal receiving component 1120 may receive the one or more uplink reference signals from each antenna of a UE. In some cases, the one or more uplink reference signals includes one or more SRS.

The precoding matrix component 1125 may determine the first precoding matrix associated with the transmission rank and the channel quality based on the received one or more uplink reference signals. In some cases, the indication of the first precoding matrix includes a PMI.

The channel state estimation component 1130 may estimate a channel state for the downlink channel based on the one or more received uplink reference signals. In some examples, the channel state estimation component 1130 may estimate a channel state of the downlink channel based on the received set of uplink reference signals. The eigenvector component 1135 may calculate an eigenvector corresponding to an SVD of a matrix combination corresponding to the estimated channel state, where the one or more received uplink reference signals are precoded by a second precoding matrix, and where determining the first precoding matrix is based on the calculated eigenvector. In some examples, the eigenvector component 1135 may identify a strongest eigenvector from a set of eigenvectors corresponding to the estimated channel state, where determining the first precoding matrix is further based on the identified strongest eigenvector The transmission configuration component 1140 may transmit a transmission configuration for receiving the one or more uplink reference signals, where a number of transmission ports available at a UE for transmitting the one or more uplink reference signals is less than a total number of transmission ports supported by the UE.

Figure 12:
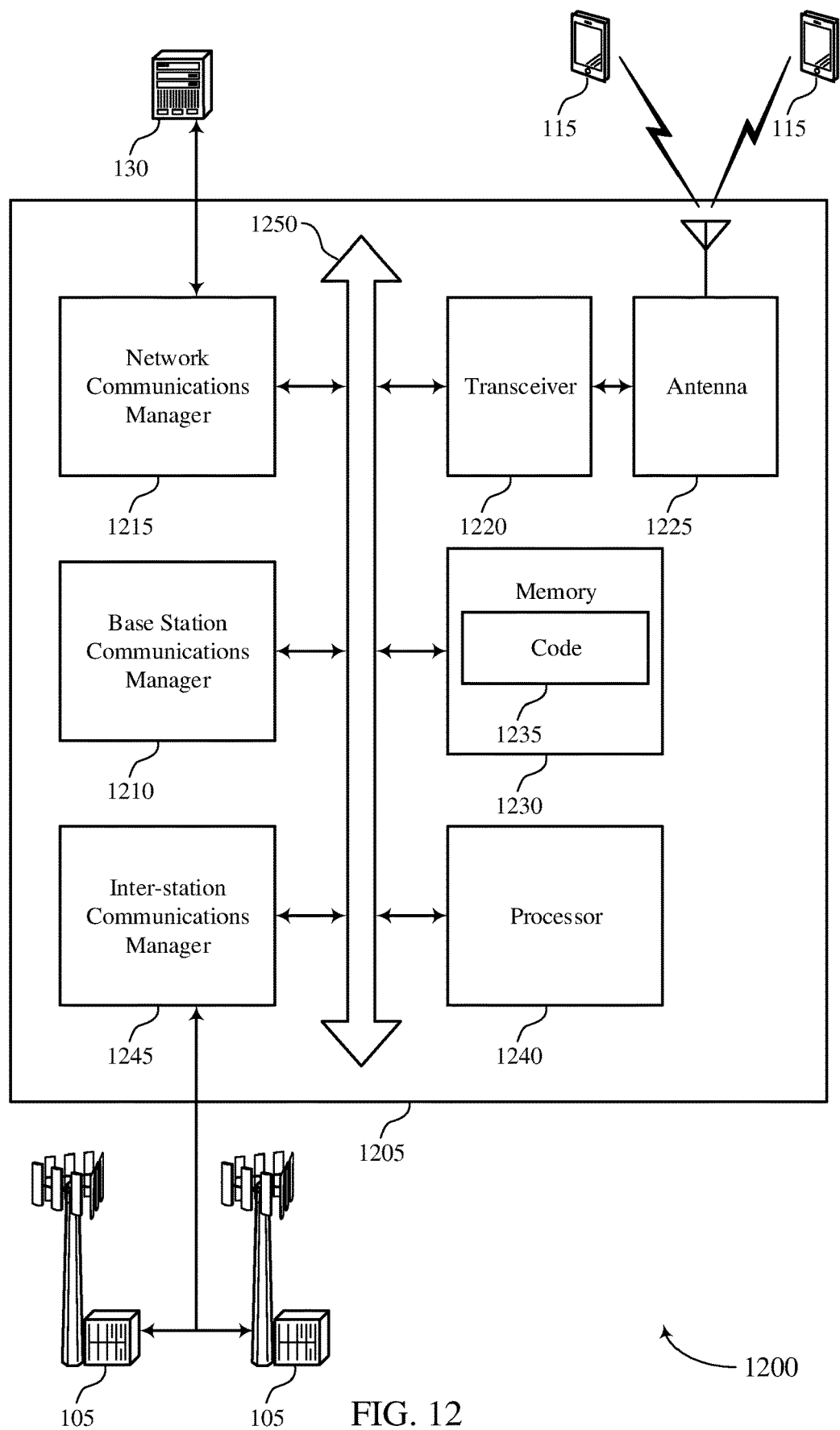
FIG. 12 shows a diagram of a system including a device that supports hybrid channel state feedback in accordance with aspects of the present disclosure.

FIG. 12 shows a diagram of a system 1200 including a device 1205 that supports hybrid channel state feedback in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may transmit a set of downlink reference signals associated with a downlink channel, receive an indication of a transmission rank and an indication of a channel quality, where the transmission rank and the channel quality are based on the transmitted set of downlink reference signals, receive one or more uplink reference signals that indicate a first precoding matrix associated with the transmission rank and the channel quality, and determine the first precoding matrix associated with the transmission rank and the channel quality based on the received one or more uplink reference signals.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting hybrid channel state feedback).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
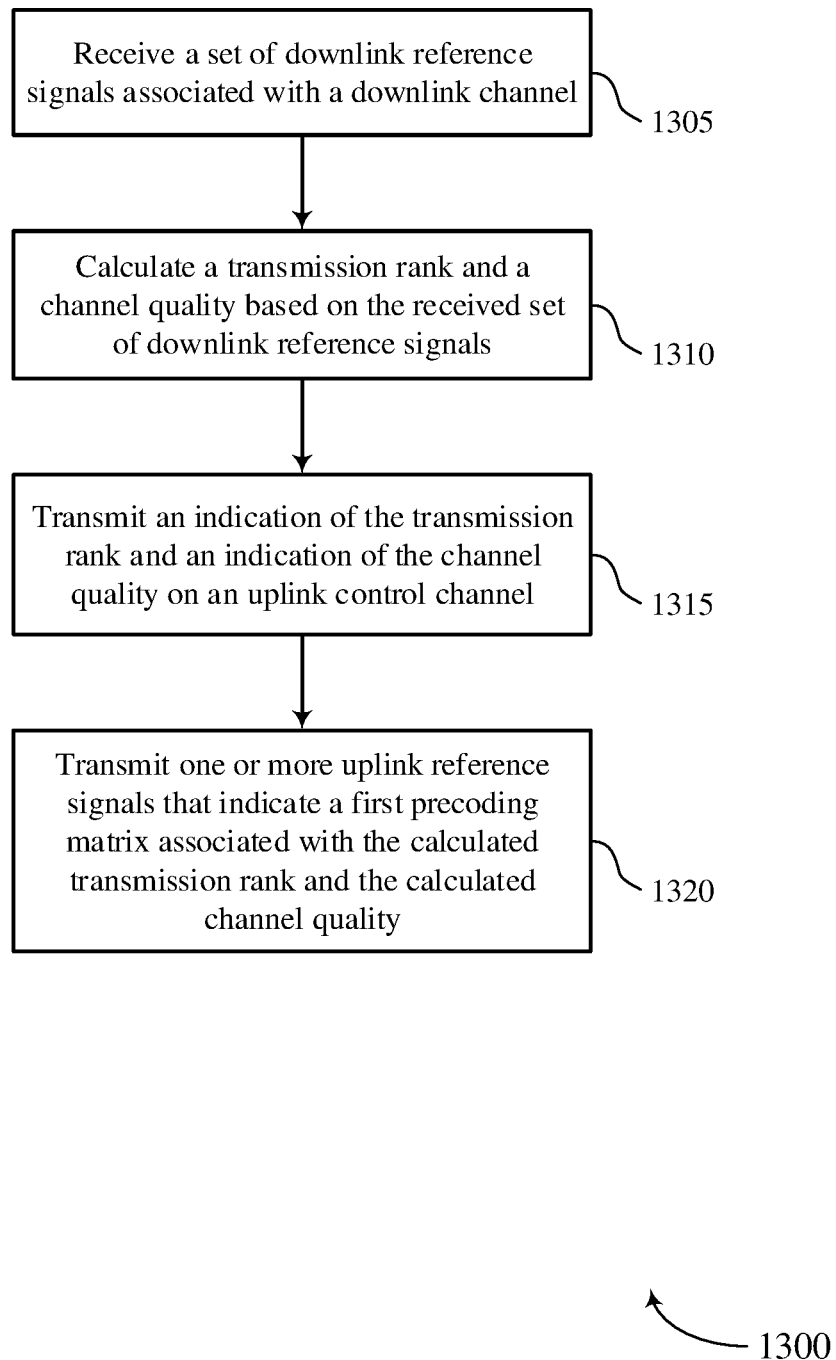
FIGS. 13 through 16 show flowcharts illustrating methods that support hybrid channel state feedback in accordance with aspects of the present disclosure.

FIG. 13 shows a flowchart illustrating a method 1300 that supports hybrid channel state feedback in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a set of downlink reference signals associated with a downlink channel. The operations of 1305 may be performed according to the methods described herein. In some examples, aspects of the operations of 1305 may be performed by a signal receiving component as described with reference to FIGS. 5 through 8.

At 1310, the UE may calculate a transmission rank and a channel quality based on the received set of downlink reference signals. The operations of 1310 may be performed according to the methods described herein. In some examples, aspects of the operations of 1310 may be performed by a calculating component as described with reference to FIGS. 5 through 8.

At 1315, the UE may transmit an indication of the transmission rank and an indication of the channel quality on an uplink control channel. The operations of 1315 may be performed according to the methods described herein. In some examples, aspects of the operations of 1315 may be performed by an indication component as described with reference to FIGS. 5 through 8.

At 1320, the UE may transmit one or more uplink reference signals that indicate a first precoding matrix associated with the calculated transmission rank and the calculated channel quality. The operations of 1320 may be performed according to the methods described herein. In some examples, aspects of the operations of 1320 may be performed by a signal transmission component as described with reference to FIGS. 5 through 8.

Figure 14:
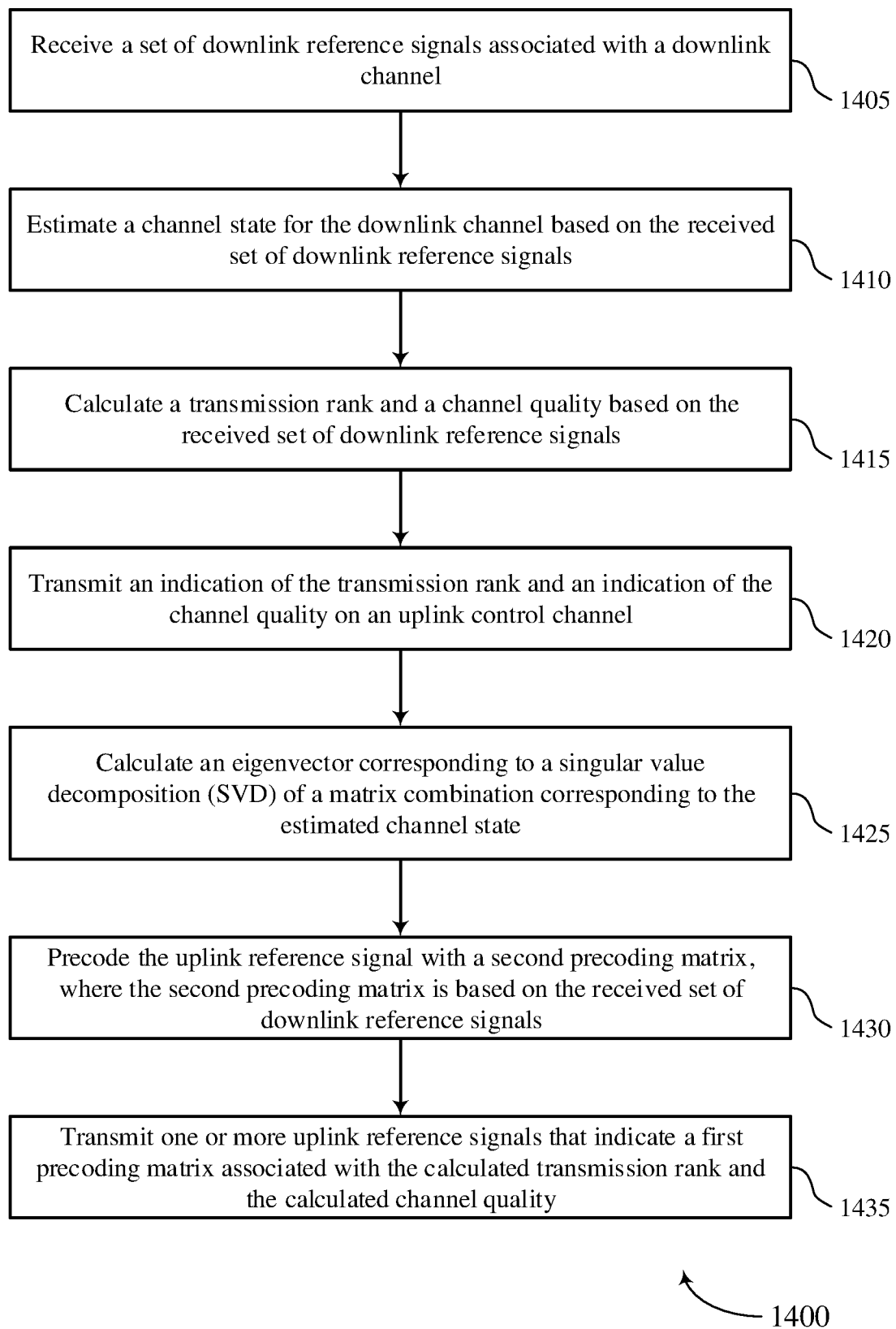

FIG. 14 shows a flowchart illustrating a method 1400 that supports hybrid channel state feedback in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a set of downlink reference signals associated with a downlink channel. The operations of 1405 may be performed according to the methods described herein. In some examples, aspects of the operations of 1405 may be performed by a signal receiving component as described with reference to FIGS. 5 through 8.

At 1410, the UE may estimate a channel state for the downlink channel based on the received set of downlink reference signals. The operations of 1410 may be performed according to the methods described herein. In some examples, aspects of the operations of 1410 may be performed by a channel state estimation component as described with reference to FIGS. 5 through 8.

At 1415, the UE may calculate a transmission rank and a channel quality based on the received set of downlink reference signals. The operations of 1415 may be performed according to the methods described herein. In some examples, aspects of the operations of 1415 may be performed by a calculating component as described with reference to FIGS. 5 through 8.

At 1420, the UE may transmit an indication of the transmission rank and an indication of the channel quality on an uplink control channel. The operations of 1420 may be performed according to the methods described herein. In some examples, aspects of the operations of 1420 may be performed by an indication component as described with reference to FIGS. 5 through 8.

At 1425, the UE may calculate an eigenvector corresponding to an SVD of a matrix combination corresponding to the estimated channel state. The operations of 1425 may be performed according to the methods described herein. In some examples, aspects of the operations of 1425 may be performed by an eigenvector component as described with reference to FIGS. 5 through 8.

At 1430, the UE may precode the uplink reference signal with a second precoding matrix, where the second precoding matrix is based on the received set of downlink reference signals. In some cases, precoding the uplink reference signal is further based on the calculated eigenvector. The operations of 1430 may be performed according to the methods described herein. In some examples, aspects of the operations of 1430 may be performed by a signal transmission component as described with reference to FIGS. 5 through 8.

At 1435, the UE may transmit one or more uplink reference signals that indicate a first precoding matrix associated with the calculated transmission rank and the calculated channel quality. The operations of 1435 may be performed according to the methods described herein. In some examples, aspects of the operations of 1435 may be performed by a precoding component as described with reference to FIGS. 5 through 8.

Figure 15:
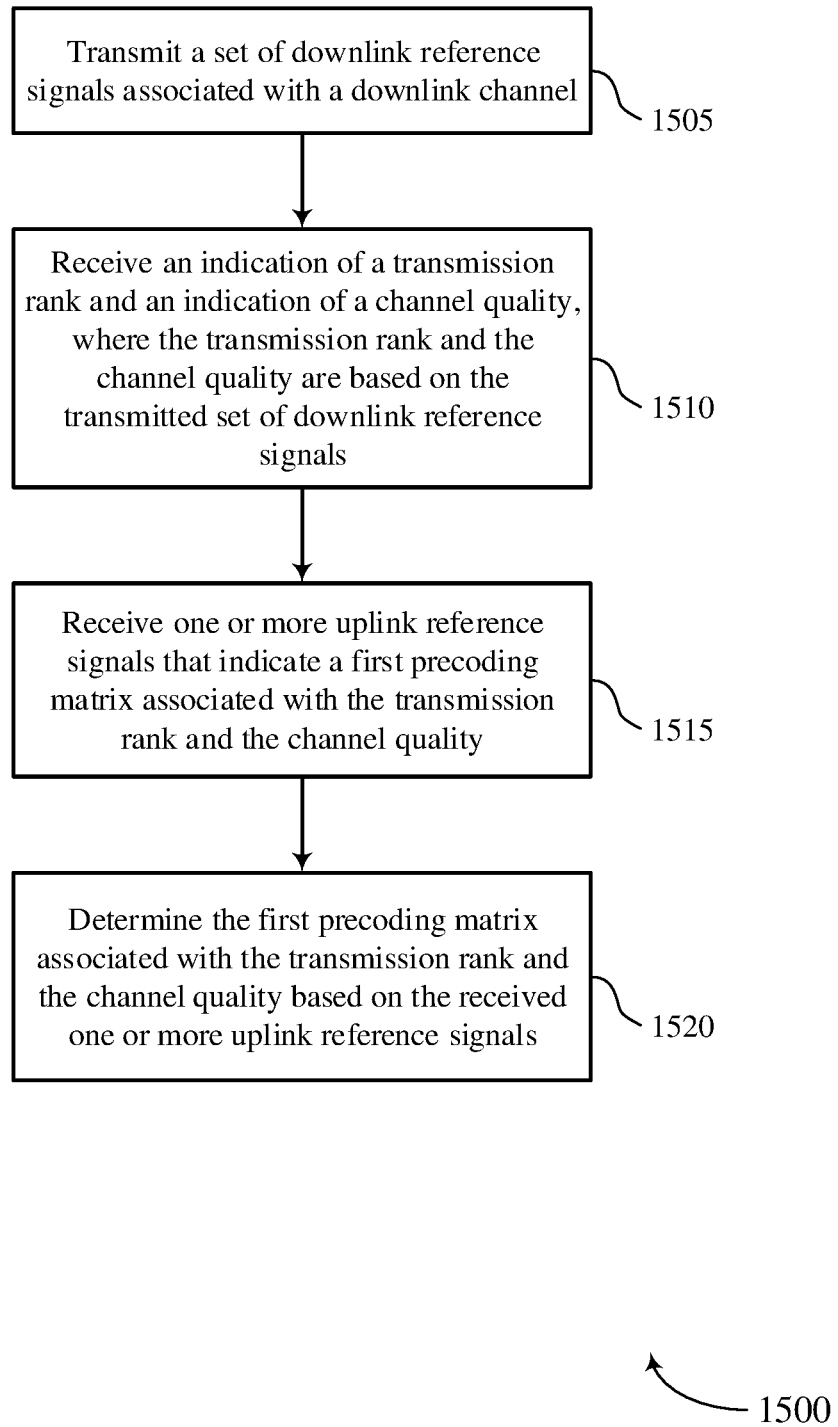

FIG. 15 shows a flowchart illustrating a method 1500 that supports hybrid channel state feedback in accordance with aspects of the present disclosure. The operations of method 1500 may be implemented by a base station 105 or its components as described herein. For example, the operations of method 1500 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit a set of downlink reference signals associated with a downlink channel. The operations of 1505 may be performed according to the methods described herein. In some examples, aspects of the operations of 1505 may be performed by a signal transmission component as described with reference to FIGS. 9 through 12.

At 1510, the base station may receive an indication of a transmission rank and an indication of a channel quality, where the transmission rank and the channel quality are based on the transmitted set of downlink reference signals. The operations of 1510 may be performed according to the methods described herein. In some examples, aspects of the operations of 1510 may be performed by an indication component as described with reference to FIGS. 9 through 12.

At 1515, the base station may receive one or more uplink reference signals that indicate a first precoding matrix associated with the transmission rank and the channel quality. The operations of 1515 may be performed according to the methods described herein. In some examples, aspects of the operations of 1515 may be performed by a signal receiving component as described with reference to FIGS. 9 through 12.

At 1520, the base station may determine the first precoding matrix associated with the transmission rank and the channel quality based on the received one or more uplink reference signals. The operations of 1520 may be performed according to the methods described herein. In some examples, aspects of the operations of 1520 may be performed by a precoding matrix component as described with reference to FIGS. 9 through 12.

Figure 16:
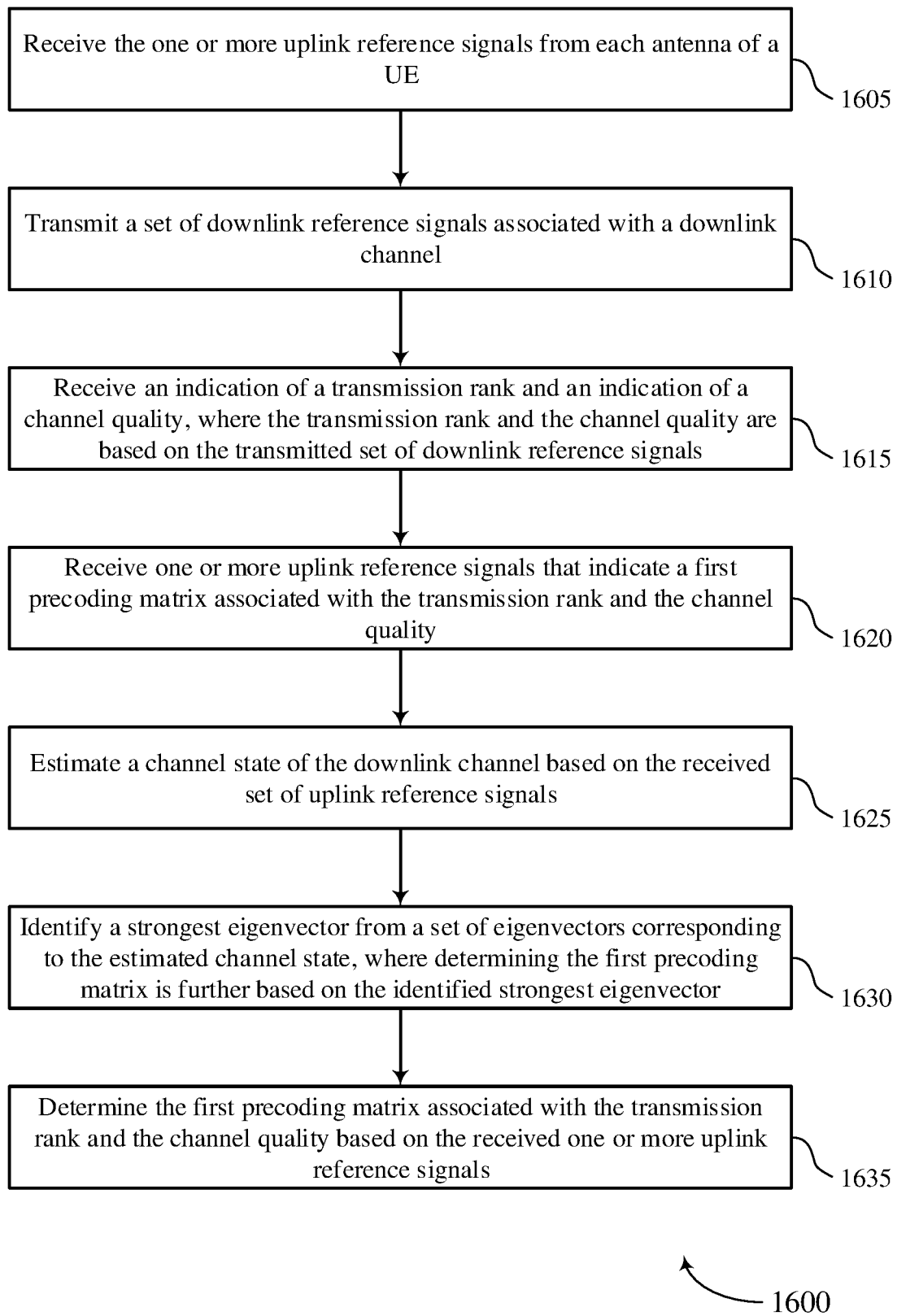

FIG. 16 shows a flowchart illustrating a method 1600 that supports hybrid channel state feedback in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may receive the one or more uplink reference signals from each antenna of a UE. The operations of 1605 may be performed according to the methods described herein. In some examples, aspects of the operations of 1605 may be performed by a signal receiving component as described with reference to FIGS. 9 through 12.

At 1610, the base station may transmit a set of downlink reference signals associated with a downlink channel. The operations of 1610 may be performed according to the methods described herein. In some examples, aspects of the operations of 1610 may be performed by a signal transmission component as described with reference to FIGS. 9 through 12.

At 1615, the base station may receive an indication of a transmission rank and an indication of a channel quality, where the transmission rank and the channel quality are based on the transmitted set of downlink reference signals. The operations of 1615 may be performed according to the methods described herein. In some examples, aspects of the operations of 1615 may be performed by an indication component as described with reference to FIGS. 9 through 12.

At 1620, the base station may receive one or more uplink reference signals that indicate a first precoding matrix associated with the transmission rank and the channel quality. The operations of 1620 may be performed according to the methods described herein. In some examples, aspects of the operations of 1620 may be performed by a signal receiving component as described with reference to FIGS. 9 through 12.

At 1625, the base station may estimate a channel state of the downlink channel based on the received set of uplink reference signals. The operations of 1625 may be performed according to the methods described herein. In some examples, aspects of the operations of 1625 may be performed by a channel state estimation component as described with reference to FIGS. 9 through 12.

At 1630, the base station may identify a strongest eigenvector from a set of eigenvectors corresponding to the estimated channel state, where determining the first precoding matrix is further based on the identified strongest eigenvector. The operations of 1630 may be performed according to the methods described herein. In some examples, aspects of the operations of 1630 may be performed by an eigenvector component as described with reference to FIGS. 9 through 12.

At 1635, the base station may determine the first precoding matrix associated with the transmission rank and the channel quality based on the received one or more uplink reference signals. The operations of 1635 may be performed according to the methods described herein. In some examples, aspects of the operations of 1635 may be performed by a precoding matrix component as described with reference to FIGS. 9 through 12.

Embodiment 1: A method of wireless communication at a user equipment (UE), comprising: receiving a set of downlink reference signals associated with a downlink channel; calculating a transmission rank and a channel quality based at least in part on the received set of downlink reference signals; transmitting an indication of the transmission rank and an indication of the channel quality on an uplink control channel; and transmitting one or more uplink reference signals that indicate a first precoding matrix associated with the calculated transmission rank and the calculated channel quality.

Embodiment 2: The method of embodiment 1, further comprising: precoding the uplink reference signal with a second precoding matrix, wherein the second precoding matrix is based at least in part on the received set of downlink reference signals.

Embodiment 3: The method of any of embodiments 1 or 2, further comprising: estimating a channel state for the downlink channel based at least in part on the received set of downlink reference signals; and calculating an eigenvector corresponding to a singular value decomposition (SVD) of a matrix combination corresponding to the estimated channel state, wherein precoding the uplink reference signal is further based at least in part on the calculated eigenvector.

Embodiment 4: The method of any of embodiments 1 to 3, further comprising: transmitting the one or more uplink reference signals using at least a subset of antennas of the UE, wherein the first precoding matrix is based at least in part on a strongest eigenvector of a set of eigenvectors calculated by the UE.

Embodiment 5: The method of any of embodiments 1 to 4, wherein the subset of the antennas of the UE comprise all antennas of the UE.

Embodiment 6: The method of any of embodiments 1 to 5, wherein the set of downlink reference signals comprises channel state information reference signals (CSI-RS).

Embodiment 7: The method of any of embodiments 1 to 6, wherein the CSI-RS are precoded signals.

Embodiment 8: The method of any of embodiments 1 to 7, further comprising: determining a number of transmission ports based at least in part on the calculated transmission rank, wherein transmitting the one or more uplink reference signals is based at least in part on the determined number of transmission ports.

Embodiment 9: The method of any of embodiments 1 to 8, wherein the determined number of transmission ports is less than a total number of transmission ports supported by the UE.

Embodiment 10: The method of any of embodiments 1 to 9, further comprising: beamforming the one or more uplink reference signals, wherein the first precoding matrix is indicated based at least in part on a direction of the beamforming.

Embodiment 11: The method of any of embodiments 1 to 10, further comprising: decomposing the first precoding matrix; multiplexing first and second components of the first precoding matrix; and transmitting the first component of the first precoding matrix using a first antenna and the second component of the first precoding matrix using a second antenna such that a superimposition of the first and second components indicates the first precoding matrix.

Embodiment 12: The method of any of embodiments 1 to 11, further comprising: adding an error margin to the calculated transmission rank and the calculated channel quality based at least in part on an uplink power control indication for the UE.

Embodiment 13: The method of any of embodiments 1 to 12, further comprising: receiving a transmission configuration for transmitting the one or more uplink reference signals, wherein a number of transmission ports available for transmitting the one or more uplink reference signals is less than a total number of transmission ports supported by the UE.

Embodiment 14: The method of any of embodiments 1 to 13, further comprising: adjusting an uplink power control at the UE based at least in part on the received transmission configuration and based at least in part on the number of transmission ports available for transmitting the one or more uplink reference signals being less than the total number of transmission ports supported by the UE.

Embodiment 15: The method of any of embodiments 1 to 14, further comprising: repeating a transmission of the one or more uplink reference signals from a subset of the total number of transmission ports supported by the UE that exceed a quality threshold based at least in part on the received transmission configuration and based at least in part on the number of transmission ports available for transmitting the one or more uplink reference signals being less than the total number of transmission ports supported by the UE.

Embodiment 16: The method of any of embodiments 1 to 15, wherein the uplink control channel comprises a physical uplink control channel (PUCCH).

Embodiment 17: The method of any of embodiments 1 to 16, wherein the indication of the transmission rank comprises a rank indication (RI).

Embodiment 18: The method of any of embodiments 1 to 17, wherein the indication of the channel quality comprises a channel quality indicator (CQI).

Embodiment 19: The method of any of embodiments 1 to 18, wherein the indication of the first precoding matrix comprises a precoding matrix indicator (PMI).

Embodiment 20: The method of any of embodiments 1 to 19, wherein the one or more uplink reference signals comprises one or more sounding reference signals (SRS).

Embodiment 21: The method of any of embodiments 1 to 20, further comprising: transmitting the indication of the transmission rank and the indication of the channel quality in a channel status information (CSI) report, wherein the CSI report is periodic, aperiodic, or a combination thereof.

Embodiment 22: The method of any of embodiments 1 to 21, wherein the periodic CSI report is associated with one or more periodic uplink reference signals, a periodicity of the periodic CSI report is different from a periodicity of the one or more periodic uplink reference signals, the periodic CSI report is associated with one or more aperiodic uplink reference signals, the aperiodic CSI report is associated with the one or more aperiodic uplink reference signals, or a combination thereof.

Embodiment 23: The method of any of embodiments 1 to 22, wherein the aperiodic CSI report is transmitted within a maximum time threshold of the aperiodic uplink reference signal transmission.

Embodiment 24: A method for wireless communications at a base station, comprising: transmitting a set of downlink reference signals associated with a downlink channel; receiving an indication of a transmission rank and an indication of a channel quality, wherein the transmission rank and the channel quality are based at least in part on the transmitted set of downlink reference signals; receiving one or more uplink reference signals that indicate a first precoding matrix associated with the transmission rank and the channel quality; and determining the first precoding matrix associated with the transmission rank and the channel quality based at least in part on the received one or more uplink reference signals.

Embodiment 25: The method of any of embodiments 1 to 24, further comprising: estimating a channel state for the downlink channel based at least in part on the one or more received uplink reference signals; and calculating an eigenvector corresponding to a singular value decomposition (SVD) of a matrix combination corresponding to the estimated channel state, wherein the one or more received uplink reference signals are precoded by a second precoding matrix, and wherein determining the first precoding matrix is based at least in part on the calculated eigenvector.

Embodiment 26: The method of any of embodiments 1 to 25, further comprising: receiving the one or more uplink reference signals from each antenna of a user equipment (UE); estimating a channel state of the downlink channel based at least in part on the received plurality of uplink reference signals; and identifying a strongest eigenvector from a set of eigenvectors corresponding to the estimated channel state, wherein determining the first precoding matrix is further based at least in part on the identified strongest eigenvector.

Embodiment 27: The method of any of embodiments 1 to 26, further comprising: precoding the set of downlink reference signals.

Embodiment 28: The method of any of embodiments 1 to 27, further comprising: transmitting a transmission configuration for receiving the one or more uplink reference signals, wherein a number of transmission ports available at a user equipment (UE) for transmitting the one or more uplink reference signals is less than a total number of transmission ports supported by the UE.

Embodiment 29: The method of any of embodiments 1 to 28, wherein the indication of the transmission rank comprises a rank indication (RI).

Embodiment 30: The method of any of embodiments 1 to 29, wherein the indication of the channel quality comprises a channel quality indicator (CQI).

Embodiment 31: The method of any of embodiments 1 to 30, wherein the indication of the first precoding matrix comprises a precoding matrix indicator (PMI).

Embodiment 32: The method of any of embodiments 1 to 31, wherein the one or more uplink reference signals comprises one or more sounding reference signals (SRS).

Embodiment 33: The method of any of embodiments 1 to 32, further comprising: receiving the indication of the transmission rank and the indication of the channel quality in a channel status information (CSI) report, wherein the CSI report is periodic, aperiodic, or a combination thereof.

Embodiment 34: The method of any of embodiments 1 to 33, wherein the periodic CSI report is associated with one or more periodic uplink reference signals, a periodicity of the periodic CSI report is different from a periodicity of the one or more periodic uplink reference signals, the periodic CSI report is associated with one or more aperiodic uplink reference signals, the aperiodic CSI report is associated with the one or more aperiodic uplink reference signals, or a combination thereof.

Embodiment 35: The method of any of embodiments 1 to 34, wherein the aperiodic CSI report is transmitted within a maximum time threshold of the aperiodic uplink reference signal transmission.

Embodiment 36: An apparatus comprising at least one means for performing a method of any of embodiments 1 to 23.

Embodiment 37: An apparatus comprising at least one means for performing a method of any of embodiments 24 to 35.

Embodiment 38: An apparatus for wireless communications comprising a processor; memory in electronic communication with the processor; and instructions stored in the memory and executable by the processor to cause the apparatus to perform a method of any of embodiments 1 to 23.

Embodiment 39: An apparatus for wireless communications comprising a processor; memory in electronic communication with the processor; and instructions stored in the memory and executable by the processor to cause the apparatus to perform a method of any of embodiments 24 to 35.

Embodiment 40: A non-transitory computer-readable medium storing code for wireless communications, the code comprising instructions executable by a processor to perform a method of any of embodiments 1 to 23.

Embodiment 41: A non-transitory computer-readable medium storing code for wireless communications, the code comprising instructions executable by a processor to perform a method of any of embodiments 24 to 35.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving a set of downlink reference signals associated with a downlink channel;
calculating a transmission rank and a channel quality based at least in part on the received set of downlink reference signals;
transmitting an indication of the transmission rank and an indication of the channel quality on an uplink control channel; and
transmitting one or more uplink reference signals that indicate a first precoding matrix associated with the calculated transmission rank and the calculated channel quality.

2. The method of claim 1, further comprising:
precoding the uplink reference signal with a second precoding matrix, wherein the second precoding matrix is based at least in part on the received set of downlink reference signals.

3. The method of claim 2, further comprising:
estimating a channel state for the downlink channel based at least in part on the received set of downlink reference signals; and
calculating an eigenvector corresponding to a singular value decomposition (SVD) of a matrix combination corresponding to the estimated channel state, wherein precoding the uplink reference signal is further based at least in part on the calculated eigenvector.

4. The method of claim 1, further comprising:
transmitting the one or more uplink reference signals using at least a subset of antennas of the UE, wherein the first precoding matrix is based at least in part on a strongest eigenvector of a set of eigenvectors calculated by the UE.

5. The method of claim 4, wherein the subset of the antennas of the UE comprise all antennas of the UE.

6. The method of claim 1, wherein the set of downlink reference signals comprises channel state information reference signals (CSI-RS).

7. The method of claim 1, further comprising:
determining a number of transmission ports based at least in part on the calculated transmission rank, wherein transmitting the one or more uplink reference signals is based at least in part on the determined number of transmission ports.

8. The method of claim 1, further comprising:
beamforming the one or more uplink reference signals, wherein the first precoding matrix is indicated based at least in part on a direction of the beamforming.

9. The method of claim 1, further comprising:
decomposing the first precoding matrix;
multiplexing first and second components of the first precoding matrix; and
transmitting the first component of the first precoding matrix using a first antenna and the second component of the first precoding matrix using a second antenna such that a superimposition of the first and second components indicates the first precoding matrix.

10. The method of claim 1, further comprising:
adding an error margin to the calculated transmission rank and the calculated channel quality based at least in part on an uplink power control indication for the UE.

11. The method of claim 1, further comprising:
receiving a transmission configuration for transmitting the one or more uplink reference signals, wherein a number of transmission ports available for transmitting the one or more uplink reference signals is less than a total number of transmission ports supported by the UE.

12. The method of claim 11, further comprising:
adjusting an uplink power control at the UE based at least in part on the received transmission configuration and based at least in part on the number of transmission ports available for transmitting the one or more uplink reference signals being less than the total number of transmission ports supported by the UE.

13. The method of claim 11, further comprising:
repeating a transmission of the one or more uplink reference signals from a subset of the total number of transmission ports supported by the UE that exceed a quality threshold based at least in part on the received transmission configuration and based at least in part on the number of transmission ports available for transmitting the one or more uplink reference signals being less than the total number of transmission ports supported by the UE.

14. The method of claim 1, wherein the uplink control channel comprises a physical uplink control channel (PUCCH), the indication of the transmission rank comprises a rank indication (RI), indication of the channel quality comprises a channel quality indicator (CQI), and the indication of the first precoding matrix comprises a precoding matrix indicator (PMI).

15. The method of claim 1, wherein the one or more uplink reference signals comprises one or more sounding reference signals (SRS).

16. The method of claim 1, further comprising:
transmitting the indication of the transmission rank and the indication of the channel quality in a channel status information (CSI) report, wherein the CSI report is periodic, aperiodic, or a combination thereof.

17. The method of claim 16, wherein the periodic CSI report is associated with one or more periodic uplink reference signals, a periodicity of the periodic CSI report is different from a periodicity of the one or more periodic uplink reference signals, the periodic CSI report is associated with one or more aperiodic uplink reference signals, the aperiodic CSI report is associated with the one or more aperiodic uplink reference signals, or a combination thereof.

18. The method of claim 17, wherein the aperiodic CSI report is transmitted within a maximum time threshold of the aperiodic uplink reference signal transmission.

19. A method for wireless communications at a base station, comprising:
transmitting a set of downlink reference signals associated with a downlink channel;
receiving an indication of a transmission rank and an indication of a channel quality, wherein the transmission rank and the channel quality are based at least in part on the transmitted set of downlink reference signals;
receiving one or more uplink reference signals that indicate a first precoding matrix associated with the transmission rank and the channel quality; and
determining the first precoding matrix associated with the transmission rank and the channel quality based at least in part on the received one or more uplink reference signals.

20. The method of claim 19, further comprising:
estimating a channel state for the downlink channel based at least in part on the one or more received uplink reference signals; and
calculating an eigenvector corresponding to a singular value decomposition (SVD) of a matrix combination corresponding to the estimated channel state, wherein the one or more received uplink reference signals are precoded by a second precoding matrix, and wherein determining the first precoding matrix is based at least in part on the calculated eigenvector.

21. The method of claim 19, further comprising:
receiving the one or more uplink reference signals from each antenna of a user equipment (UE);
estimating a channel state of the downlink channel based at least in part on the received plurality of uplink reference signals; and
identifying a strongest eigenvector from a set of eigenvectors corresponding to the estimated channel state, wherein determining the first precoding matrix is further based at least in part on the identified strongest eigenvector.

22. The method of claim 19, further comprising:
transmitting a transmission configuration for receiving the one or more uplink reference signals, wherein a number of transmission ports available at a user equipment (UE) for transmitting the one or more uplink reference signals is less than a total number of transmission ports supported by the UE.

23. The method of claim 19, wherein the indication of the transmission rank comprises a rank indication (RI), the indication of the channel quality comprises a channel quality indicator (CQI), and the indication of the first precoding matrix comprises a precoding matrix indicator (PMI).

24. The method of claim 19, wherein the one or more uplink reference signals comprises one or more sounding reference signals (SRS).

25. The method of claim 19, further comprising:
receiving the indication of the transmission rank and the indication of the channel quality in a channel status information (CSI) report, wherein the CSI report is periodic, aperiodic, or a combination thereof.

26. The method of claim 25, wherein the periodic CSI report is associated with one or more periodic uplink reference signals, a periodicity of the periodic CSI report is different from a periodicity of the one or more periodic uplink reference signals, the periodic CSI report is associated with one or more aperiodic uplink reference signals, the aperiodic CSI report is associated with the one or more aperiodic uplink reference signals, or a combination thereof.

27. The method of claim 26, wherein the aperiodic CSI report is transmitted within a maximum time threshold of the aperiodic uplink reference signal transmission.

28. An apparatus for wireless communications at a user equipment (UE), comprising:
a processor,
memory in electronic communication with the processor; and
instructions stored in the memory and executable by the processor to cause the apparatus to:
receive a set of downlink reference signals associated with a downlink channel;
calculate a transmission rank and a channel quality based at least in part on the received set of downlink reference signals;
transmit an indication of the transmission rank and an indication of the channel quality on an uplink control channel; and
transmit one or more uplink reference signals that indicate a first precoding matrix associated with the calculated transmission rank and the calculated channel quality.

29. The apparatus of claim 28, wherein the instructions are further executable by the processor to cause the apparatus to:
precode the uplink reference signal with a second precoding matrix, wherein the second precoding matrix is based at least in part on the received set of downlink reference signals.

30. An apparatus for wireless communications at a base station, comprising:
a processor,
memory in electronic communication with the processor; and
instructions stored in the memory and executable by the processor to cause the apparatus to:
transmit a set of downlink reference signals associated with a downlink channel;
receive an indication of a transmission rank and an indication of a channel quality, wherein the transmission rank and the channel quality are based at least in part on the transmitted set of downlink reference signals;
receive one or more uplink reference signals that indicate a first precoding matrix associated with the transmission rank and the channel quality; and
determine the first precoding matrix associated with the transmission rank and the channel quality based at least in part on the received one or more uplink reference signals.

* * * * *